United States Patent
Koizumi et al.

(10) Patent No.: US 8,531,600 B2
(45) Date of Patent: Sep. 10, 2013

(54) VIDEO SIGNAL PROCESSING APPARATUS AND METHOD

(75) Inventors: Maki Koizumi, Yokohama (JP); Atsushi Yoshida, Yokohama (JP)

(73) Assignee: JVC Kenwood Corporation, Yokohama-shi, Kanagawa (JP)

( * ) Notice: Subject to any disclaimer, the term of this patent is extended or adjusted under 35 U.S.C. 154(b) by 0 days.

(21) Appl. No.: 13/483,854

(22) Filed: May 30, 2012

(65) Prior Publication Data

US 2012/0307142 A1 Dec. 6, 2012

(30) Foreign Application Priority Data

May 31, 2011 (JP) ............................ P2011-122045
May 31, 2011 (JP) ............................ P2011-122051
May 31, 2011 (JP) ............................ P2011-122057
Feb. 17, 2012 (JP) ............................ P2012-032741
Feb. 17, 2012 (JP) ............................ P2012-032747
Feb. 17, 2012 (JP) ............................ P2012-032801
Feb. 17, 2012 (JP) ............................ P2012-032803

(51) Int. Cl.
*H04N 7/01* (2006.01)

(52) U.S. Cl.
USPC .......................... 348/441; 348/452; 348/701

(58) Field of Classification Search
USPC ................ 348/441, 443, 451–452, 458, 459, 348/699, 701, 402.1, 413.1, 416.1–418.1; 382/236; 375/240.15, 240.16
IPC ........................................................ H04N 7/01
See application file for complete search history.

(56) References Cited

U.S. PATENT DOCUMENTS

| | | | |
|---|---|---|---|
| 7,460,172 B2 * | 12/2008 | Min | 348/441 |
| 7,710,498 B2 * | 5/2010 | Kondo et al. | 348/441 |
| 8,319,889 B2 * | 11/2012 | Noguchi | 348/441 |
| 2011/0122951 A1 * | 5/2011 | Kimura | 375/240.16 |

FOREIGN PATENT DOCUMENTS

JP 2008-141546 A 6/2008

\* cited by examiner

*Primary Examiner* — Trang U Tran
(74) *Attorney, Agent, or Firm* — Nath, Goldberg & Meyer; Jerald L. Meyer; Stanley N. Protigal

(57) ABSTRACT

A frequency distribution monitor unit partitions, into a plurality of classes, a size of a vertical component of a motion vector, and detects a frequency of the number of occurrences at which the vertical component occurs in each of the classes. In a case where the vertical component of the motion vector exceeds a predetermined threshold value in predetermined specific classes, the offset control unit creates offset signals which shift read addresses in the vertical direction in delay units. A selection control unit controls to shift, in the vertical direction, pixel data selected by delay selection units.

16 Claims, 16 Drawing Sheets

VIDEO SIGNAL PROCESSING APPARATUS AND METHOD

CROSS REFERENCE TO RELATED APPLICATION

This invention is based upon and claims the benefit of priority under 35 U.S.C. §119 to Japanese Patent Applications No. P2011-122045, filed on May 31, 2011, No. P2011-122051, filed on May 31, 2011, No. P2011-122057, filed on May 31, 2011, No. P2012-032741, filed on Feb. 17, 2012, No. P2012-032747, filed on Feb. 17, 2012, No. P2012-032801, filed on Feb. 17, 2012, and No. P2012-032803, filed on Feb. 17, 2012, the entire contents of which are incorporated herein by reference.

BACKGROUND OF THE INVENTION

The present invention relates to video signal processing apparatus and method for processing a video signal, and particularly, relates to a video signal processing apparatus and method in which interpolation processing for creating interpolated pixels based on motion vectors is improved.

When an image display device using a liquid crystal panel displays a moving image, an afterimage is prone to occur. Accordingly, in order to reduce the afterimage, interpolated frames are interpolated among actual frames of the video signal to thereby increase the number of frames. For example, a vertical frequency of 60 Hz as a frame rate is converted into a double vertical frequency of 120 Hz or more, and the image is displayed. In a video signal processing apparatus that performs frame rate conversion, motion vectors of the image are detected, the respective interpolated pixels are created by using the motion vectors, and the interpolated frames to be interpolated among the actual frames are created. An example of the video signal processing apparatus that performs the frame rate conversion is described in Japanese Patent Laid-Open Publication No. 2008-141546.

SUMMARY OF THE INVENTION

In the video signal processing apparatus that creates the interpolated pixels based on the motion vectors and creates the interpolated frames, in order to enhance interpolation accuracy and to obtain a frame rate-converted image with high quality, it is effective to widen a range of the interpolation processing. That is to say, even in the case where a motion of the image is large, it is necessary to create the interpolated pixels by using appropriate pixels of the actual frame. However, in order to widen the range of the interpolation processing, the number of line memories which delay the video signal in a vertical direction must be increased, and the number of pixel delay devices which delay the video signal in a horizontal direction must be increased. When the number of line memories and the number of pixel delay devices are increased, a circuit scale becomes large, and cost rises. In particular, the increase of the line memories largely affects such increases of the circuit scale and the cost. Accordingly, it is desired that the range of the interpolation processing be expanded while suppressing the increase of the line memories.

In order to deal with such a desire, it is an object of the present invention to provide video signal processing apparatus and method, which are capable of expanding the range of the interpolation processing while suppressing the increase of the line memories, and are capable of creating appropriate interpolated pixels based on the motion vectors even in the case where the motion of the image in the vertical direction is large.

In order to solve the foregoing problems of the conventional technology, a first aspect of the present invention provides a video signal processing apparatus comprising: a first delay unit configured to delay an input video signal by one frame period or a period of a plurality of lines, and to output the input video signal thus delayed as a first delayed video signal; a second delay unit configured to delay the first delayed video signal by one frame period, and to output the first delayed video signal thus delayed as a second delayed video signal; a first delay selection unit configured to sequentially delay pixel data of the first delayed video signal in horizontal and vertical directions, to create a plurality of pixel data included in a first reference range for use in an event of creating interpolated pixel data, and to select any from the plurality of pixel data; a second delay selection unit configured to sequentially delay pixel data of the second delayed video signal in the horizontal and vertical directions, to create a plurality of pixel data included in a second reference range for use in the event of creating the interpolated pixel data, and to select any from the plurality of pixel data; a frequency distribution monitor unit configured to partition, into a plurality of classes, a size of a vertical component of a motion vector for use in the event of creating the interpolated pixel data, and to detect a frequency of the number of occurrences at which the vertical component of the motion vector occurs in each of the classes; an offset control unit configured, in a case where the vertical component of the motion vector, the vertical component being detected in the frequency distribution monitor unit, exceeds a predetermined threshold value in predetermined specific classes, to create a first offset signal that shifts a read address in the vertical direction in an event of reading out the first delayed video signal from the first delay unit and then to supply the created first offset signal to the first delay unit, and to create a second offset signal that shifts a read address in the vertical direction in an event of reading out the second delayed video signal from the second delay unit and then to supply the created second offset signal to the second delay unit; and a selection control unit configured to shift the pixel data in the vertical direction based on the first offset signal, the pixel data being selected by the first delay selection unit, and to shift the pixel data in the vertical direction based on the second offset signal, the pixel data being selected by the second delay selection unit.

A second aspect of the present invention provides a video signal processing method comprising: by a first delay unit, delaying an input video signal by one frame period or a period of a plurality of lines, and outputting the input video signal thus delayed as a first delayed video signal; by a second delay unit, delaying the first delayed video signal by one frame period, and outputting the first delayed video signal thus delayed as a second delayed video signal; sequentially delaying pixel data of the first delayed video signal in horizontal and vertical directions, and creating a plurality of pixel data included in a first reference range for use in an event of creating interpolated pixel data; sequentially delaying pixel data of the second delayed video signal in the horizontal and vertical directions, and creating a plurality of pixel data included in a second reference range for use in the event of creating the interpolated pixel data; partitioning, into a plurality of classes, a size of a vertical component of a motion vector for use in the event of creating the interpolated pixel data, and detecting a frequency of the number of occurrences at which the vertical component of the motion vector occurs in each of the classes; in a case where the vertical component of the motion vector exceeds a predetermined threshold value in predetermined specific classes, shifting, based on a first offset signal, a read address in the vertical direction in an event of reading out the first delayed video signal from the first delay unit, and shifting, based on a second offset signal, a read address in the vertical direction in an event of reading out the second delayed video signal from the second delay unit; shifting, based on the first offset signal, a position of first pixel data in the vertical direction in an event of selecting and reading out the first pixel data from plurality of pixel data within the first reference range, and shifting, based on the second offset signal, a position of second pixel data in the vertical direction in an event of selecting and reading out the second pixel data from plurality of pixel data within the second reference range; and creating the interpolated pixel data based on the first pixel data read out from the first reference range, and on the second pixel data read out from the second reference range.

DESCRIPTION OF THE EMBODIMENTS

A description is made below of respective embodiments of video signal processing apparatus and method of the present invention with reference to the accompanying drawings. Each of first, second, fourth and fifth embodiments, which will be described below in detail, shows a frame rate conversion device, which converts a vertical frequency of 60 Hz as a frame rate into that of 120 Hz, as an example of the video signal processing apparatus. A third embodiment shows, as an example, a dejudder processing apparatus that performs so-called dejudder processing for smoothing a motion of a video signal created based on a film image without converting the frame rate. The video signal processing apparatus just needs to be a device that creates interpolated pixels based on motion vectors. The video signal processing apparatus may also be a frame rate conversion device that converts the frame rate to four times or more.

[First Embodiment]

Figure 1:
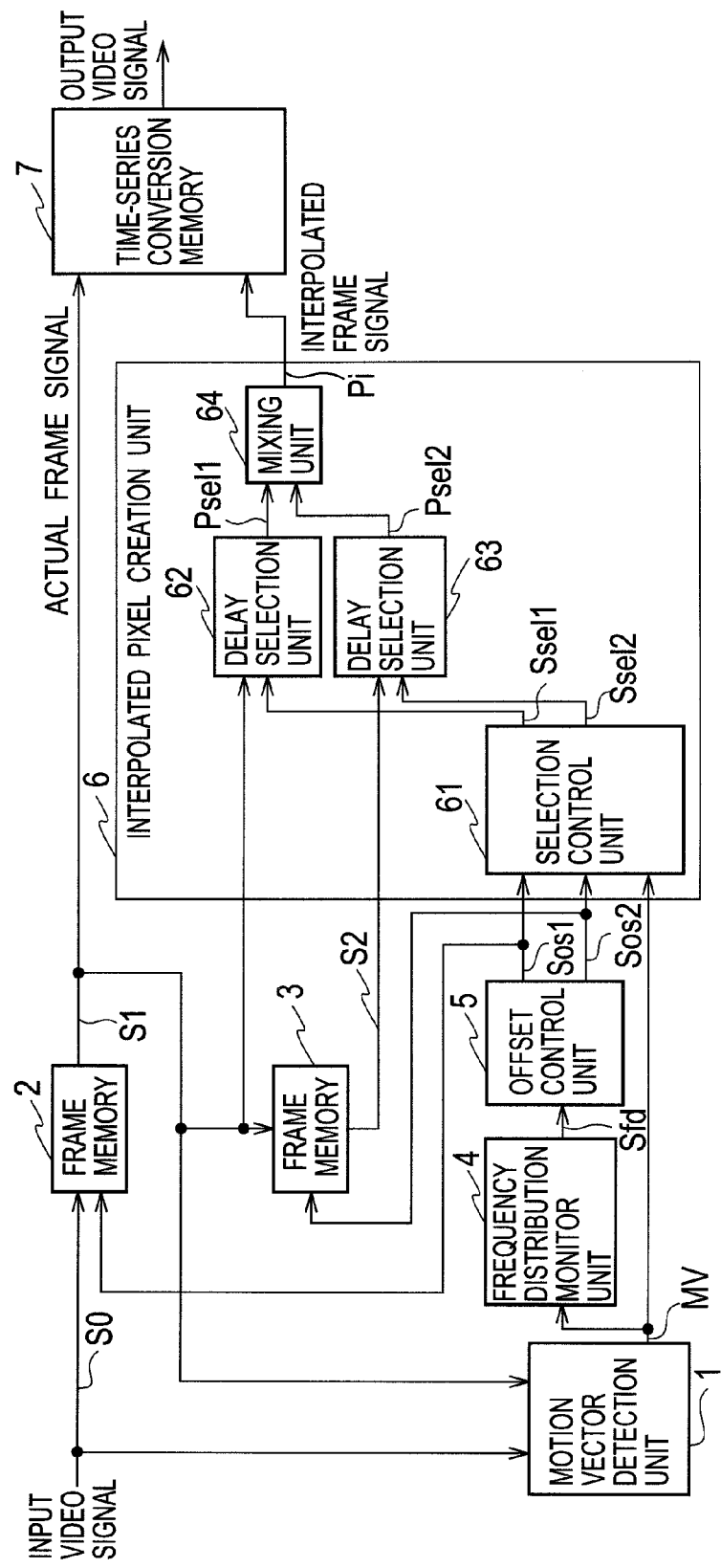
FIG. 1 is a block diagram showing a first embodiment.

A description is made of a configuration and operations of a first embodiment by using FIG. 1 to FIG. 8. In FIG. 1, to a motion vector detection unit 1 and a frame memory 2, respective pieces of image data which compose an input video signal S0 are sequentially inputted. A vertical frequency of the input video signal S0 is 60 Hz. The frame memory 2 delays the input video signal S0 by one frame period, and outputs the delayed input video signal as a video signal (first delayed video signal) S1. The video signal S1 is inputted to the motion vector detection unit 1, to a frame memory 3 and to a delay selection unit 62 in an interpolated pixel creation unit 6. The frame memory 3 delays the video signal S1 by one frame period, and outputs the delayed input video signal as a video signal (second delayed video signal) S2. The video signal S2 is inputted to a delay selection unit 63 in the interpolated pixel creation unit 6.

The motion vector detection unit 1 compares pixel levels in search ranges composed of pluralities of predetermined pixels in a horizontal direction and a vertical direction of the input video signal S0 and the video signal S1 with each other, and outputs a direction, in which a difference therebetween is smallest, as a motion vector MV. The motion vector detection unit 1 includes a plurality of line memories and a plurality of pixel delay devices such as flip-flops. As the motion vector detection unit 1, a unit with a publicly known configuration just needs to be employed, and accordingly, a specific configuration of the motion vector detection unit 1 is omitted. Here, the motion vector MV is detected by using the pluralities of pixels of two frames adjacent to each other; however, in order to enhance detection accuracy, the motion vector MV may be detected by using pluralities of pixels of three frames or more.

Figure 2:
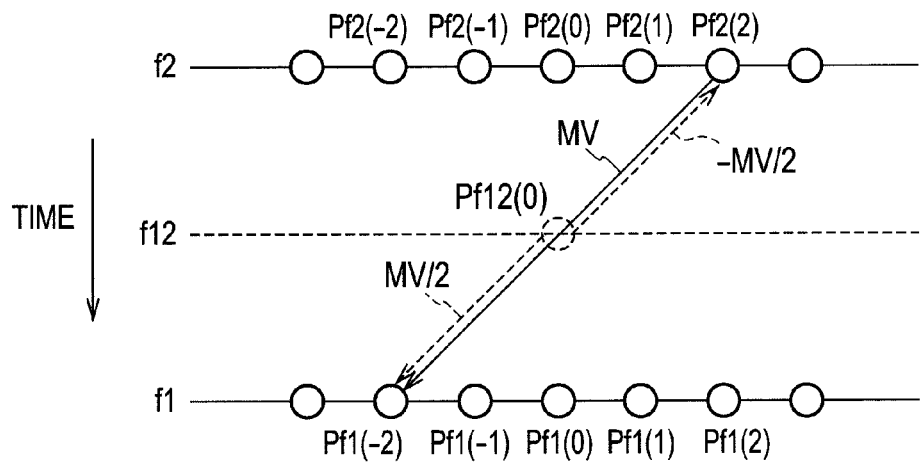
FIG. 2 is a view for explaining motion vectors.

The motion vector MV outputted from the motion vector detection unit 1 is inputted to a frequency distribution monitor unit 4 and to a selection control unit 61 in the interpolated pixel creation unit 6. In FIG. 2, it is assumed that the video signal S1 is an actual frame f1, and that the video signal S2 is an actual frame f2. It is assumed that an interpolated frame f12 is interpolated between the actual frames f1 and f2. As an example, the motion vector detection unit 1 detects the motion vector MV while taking pixels of the actual frame f2 as a reference. As shown in FIG. 2, on the actual frame f1, pixels Pf1(−2), Pf1(−1), Pf1(0), Pf1(1), Pf1(2) . . . are arrayed, and on the actual frame f2, pixels Pf2(−2), Pf2(−1), Pf2(0), Pf2(1), Pf2(2) . . . are arrayed. It is assumed that the motion vector MV in the event of creating an interpolated pixel Pf12(0) of the interpolated frame f12 is a vector as illustrated.

In FIG. 2, in order to create the interpolated pixel Pf12(0), an average between the pixels Pf1(−2) on the actual frame f1 and the pixel Pf2(2) on the actual frame f2 just needs to be taken. In the event of creating the interpolated pixels, the interpolated pixel creation unit 6 to be described later does not directly use the motion vector MV in which the pixel of the actual frame f2 is taken as a reference. The interpolated pixel creation unit 6 converts the motion vector MV into a motion vector MV/2 between the actual frame f1 and the interpolated frame f12, in which the interpolated pixel Pf12(0) is taken as reference, and into a motion vector −MV/2 between the actual frame f2 and the interpolated frame f12, in which the interpolated pixel Pf12(0) is taken as a reference. The interpolated pixel creation unit 6 uses the motion vector MV/2 and −MV/2.

The frequency distribution monitor unit 4 monitors the motion vector, for example, in a frame unit, and detects how large a vertical component of the motion vector MV is and how the vertical component concerned is distributed. For example, as shown in a histogram of FIG. 3, a range taken by the vertical component of the motion vector MV is partitioned into ranges with a fixed width, and the partitioned ranges are defined as classes, and the number of times that each of the classes occurs in one frame is defined as a frequency. In an example shown in FIG. 3, the vertical component of the motion vector MV takes a range of 8 to −8, and the range is partitioned by every two values, and the partitioned ranges are defined as the classes. Each numeral of the classes denotes the number of pixels (number of lines) as the vertical component of the motion vector MV. Note that, in the vertical component of the motion vector MV, when the actual frame f2 of the video signal S2 is viewed from the actual frame f1 of the video signal S1, the case where such a viewing direction goes upward in the vertical direction is defined as a case in a positive direction, and the case where the viewing direction goes downward therein is defined as a case in a negative direction.

The number of occurrences of each class may be counted based on all of the motion vectors MV detected in one frame, or the number of occurrences thereof may be counted while reducing the motion vectors MV. Note that the motion vectors MV may be obtained individually for all of the pixels in one frame, or the motion vectors MV may be obtained in a plural pixel unit.

Figure 3:
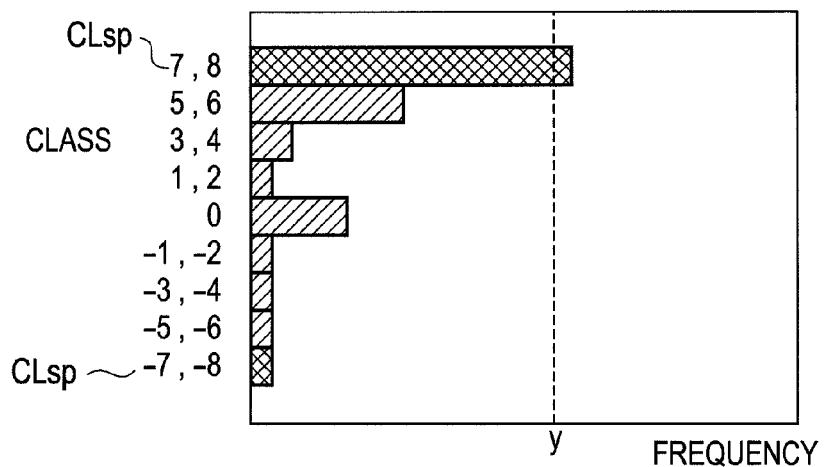
FIG. 3 is a chart showing an example of a histogram of a frequency distribution detected by a frequency distribution monitor unit 4.

The frequency distribution monitor unit 4 supplies data Sfd, which indicates the frequency distribution obtained as in FIG. 3, to an offset control unit 5. The offset control unit 5 creates offset signals Sos1 and Sos2, each of which indicates a predetermined offset amount in which an absolute value exceeds 0, in the case where the frequency exceeds a threshold value y in a specific class CLsp of the frequency distribution shown in FIG. 3. In the case where the frequency does not exceed the threshold value y, the offset control unit 5 outputs the offset signals Sos1 and Sos2, each of which indicates an offset amount of 0. A description is made below of the offset amount in detail.

As will be described later, each of the delay selection units 62 and 63 in the interpolated pixel creation unit 6 delays the respective image data by one to four pixels in the horizontal direction, and delays the received image data concerned by one to four lines in the vertical direction. That is to say, the delay selection units 62 and 63 select predetermined image data from pixel data in ranges in the video signals S1 and S2, each range being of five pixels in the horizontal direction and five pixels in the vertical direction. Preferably, the specific class CLsp set in the offset control unit 5 is set at a class where predetermined pixel data for creating interpolated pixel data based on the motion vectors (MV/2, −MV/2) cannot be selected by the delay selection units 62 and 63 in the event where the predetermined pixel data is selected thereby.

In the first embodiment, it is assumed that the class where the predetermined pixel data cannot be selected is a class of 5, 6, a class of 7, 8, a class of −5, −6, and a class of −7, −8, and that, here, the specific class CLsp is the class of 7, 8 and the class of −7, −8. The example of FIG. 3 shows a state where the frequency exceeds the threshold value y at the class of 7, 8. The class of 5, 6 and the class of −5 and −6 may be taken as such specific classes, and all of the class of 5, 6, the class of 7, 8, the class of −5, −6 and the class of −7, −8 may be taken as the specific classes.

When the class of 5, 6, the class of 7, 8, the class of −5, −6 and the class of −7 and −8 are taken as the specific classes CLsp, the offset signals Sos1 and Sos2, each of which indicates the predetermined offset amount, may be created in the case where a frequency obtained by summing up the frequency in the class of 5, 6 and the frequency in the class of 7, 8 exceeds the threshold value y, or where a frequency obtained by summing up the frequency in the class of −5, −6 and the frequency in the class of −7, −8 exceeds the threshold value y.

The offset signal Sos1 is inputted to the frame memory 2, and the offset signal Sos2 is inputted to the frame memory 3. The offset signals Sos1 and Sos2 are also inputted to the selection control unit 61.

Figure 4:
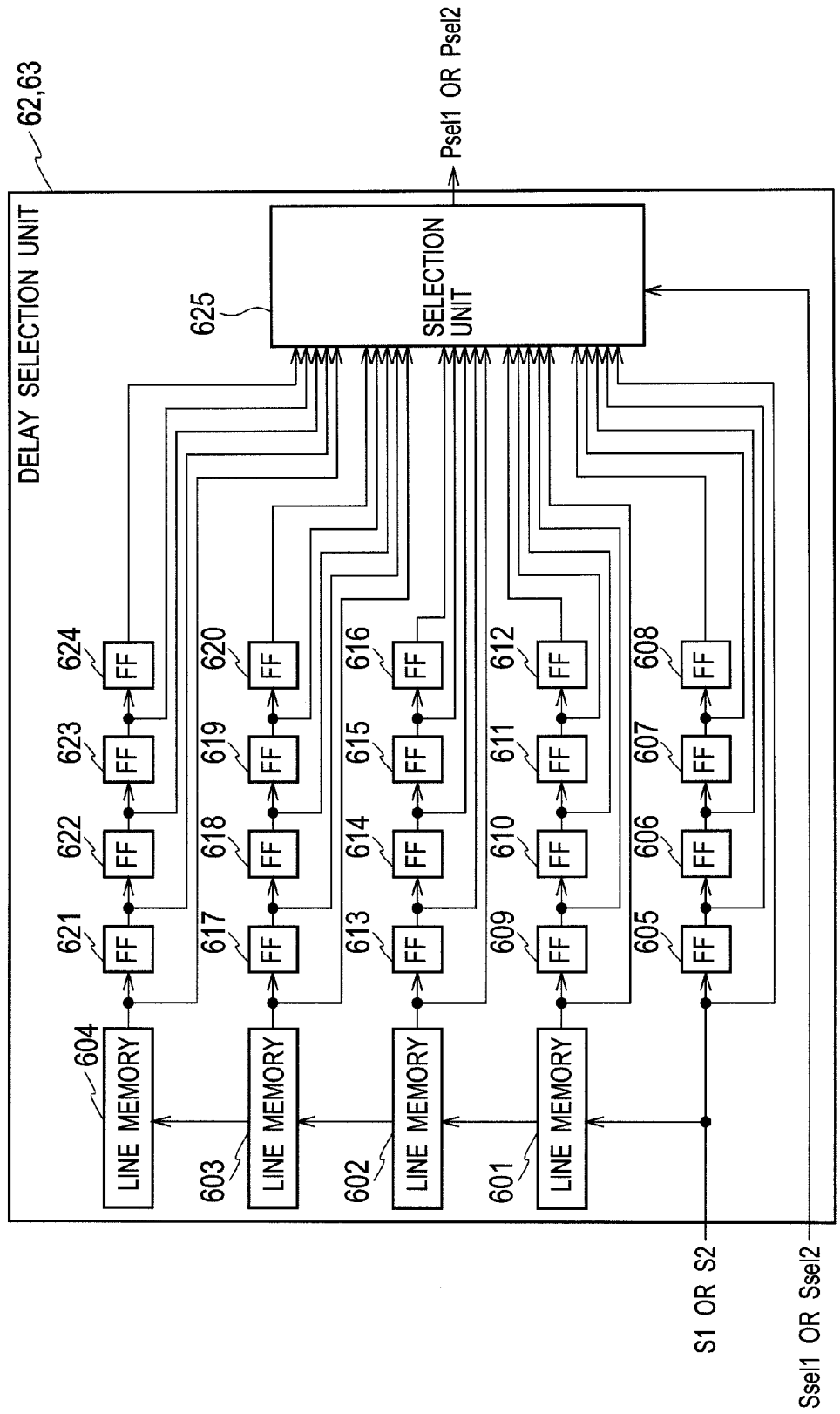
FIG. 4 is a block diagram showing a specific configuration example of delay selection units 62 and 63.

Here, a description is made of specific configuration and operations of each of the delay selection units 62 and 63 by using FIG. 4. Each of the delay selection units 62 and 63 includes: line memories 601 to 604; flip-flops 605 to 624 as pixel delay devices; and a selection unit 625. The pixel data of the video signal S1 or S2 is sequentially delayed by every one line period by the line memories 601 to 604. The inputted pixel data is sequentially delayed by every one pixel period by the flip-flops 605 to 608. The pixel data outputted from the line memory 601 is sequentially delayed by every one pixel period by the flip-flops 609 to 612. The pixel data outputted from the line memory 602 is sequentially delayed by every one pixel period by the flip-flops 613 to 616. The pixel data outputted from the line memory 603 is sequentially delayed by everyone pixel period by the flip-flops 617 to 620. The pixel data outputted from the line memory 604 is sequentially delayed by every one pixel period by the flip-flops 621 to 624.

The inputted pixel data, pixel data outputted from the line memories 601 to 604, and pixel data outputted from the flip-flops 605 to 624 are inputted to the selection unit 625. The pixel data inputted to the selection unit 625 is pixel data of 25 pixels in total, which is included in the range of five pixels in the horizontal direction and five pixels in the vertical direction in the video signal S1 or S2. The pixel data outputted from the flip-flop 614 is center pixel data in the pixel data of 25 pixels, and a position of the pixel data outputted from the flip-flop 614 becomes a reference position.

In the first embodiment, each of the delay selection units 62 and 63 selects one piece of the pixel data from the pixel data of 25 pixels as such a reference range in the event of creating the interpolated pixel data; however, the reference range is not limited to 25 pixels. More line memories and more flip-flops may be provided, and one piece of the pixel data may be selected from pixels more than 25 pixels in each reference range.

First, a description is made of the case where the vertical component of the motion vector MV is, for example, four pixels (four lines). As mentioned above, motion vectors for use in the event of creating the interpolated pixel data in the interpolated pixel creation unit 6 are the motion vectors MV/2 and −MV/2. Accordingly, in the case where the vertical component of the motion vector MV is four pixels, vertical components of the motion vectors for use in the interpolated pixel creation unit 6 become +2 pixels and −2 pixels. As understood from FIG. 4, in the case where the position of the pixel data outputted from the flip-flop 614 is taken as the reference position, each of the delay selection units 62 and 63 is capable of selecting pixel data at positions shifted by +2 pixels and −2 pixels in the vertical direction. That is to say, if the vertical component of the motion vector is within four pixels, then the pixel data can be selected while leaving, at the reference position, the position of the pixel data outputted from the flip-flop 614.

Next, a description is made of the case where the vertical component of the motion vector MV is, for example, eight pixels (eight lines). In the case where the vertical component of the motion vector MV is eight pixels, the vertical components of the motion vectors for use in the interpolated pixel creation unit 6 become +4 pixels and −4 pixels. As understood from FIG. 4, in the case where the position of the pixel data outputted from the flip-flop 614 is taken as the reference position, each of the delay selection units 62 and 63 cannot select pixel data at positions shifted by +4 pixels and −4 pixels in the vertical direction. Accordingly, in the first embodiment, a configuration is adopted in the following manner so that, in the case where the frequency exceeds the threshold value y in at least one of the class of 7, 8 and the class of −7, −8, which are the specific classes CLsp, the pixel data corresponding to the vertical component of the motion vector MV can be selected and outputted by each of the delay selection units 62 and 63.

It is assumed that the vertical component of the motion vector MV as the reference taken when the offset control unit 5 obtains the offset amount is eight pixels. The selection range of the pixel data in the vertical direction in the case where the position of the pixel data outputted from the flip-flop 614 is taken as the reference position is +2 pixels and −2 pixels, and accordingly, in order to select pixel data at positions shifted by +4 pixels and −4 pixels in the vertical direction in each of the delay selection units 62 and 63, the offset amount of the offset signal Sos1 just needs to be set at 2, and the offset amount of the offset signal Sos2 just needs to be set at −2.

The offset signal Sos1 indicating the offset amount 2 is inputted to the frame memory 2, and the offset signal Sos2 indicating the offset amount −2 is inputted to the frame memory 3. Each of the frame memories 2 and 3 shifts a read address in the vertical direction in the event of reading out each of the video signals S1 and S2 in response to the offset amount inputted thereto.

The selection control unit 61 creates selection control signals Ssel1 and Ssel2 in response to the offset amount of the offset signals Sos1 and Sos2 inputted thereto, and inputs the created selection control signals Ssel1 and Ssel2 to the delay selection units 62 and 63. As shown in FIG. 4, the selection control signal Ssel1 or Ssel2 is inputted to the selection unit 625. If the offset amounts of the offset signals Sos1 and Sos2 are 0, then for the selection unit 625 of each of the delay selection units 62 and 63, the selection control unit 61 creates and supplies thereto such selection control signals Ssel1 and Ssel2 that allows the selection unit 625 concerned to select the pixel data based on the motion vectors MV/2 and −MV/2 while taking, as the reference position, the position of the pixel data outputted from the flip-flop 614.

Meanwhile, if the offset amount of the offset signal Sos1 is 2, then for the selection unit 625 of the delay selection unit 62, the selection control unit 61 creates and supplies thereto such a selection control signal Ssel1 that allows the selection unit 625 concerned to select the pixel data based on the motion vector MV/2 while taking, as the reference position, a position of pixel data outputted from the flip-flop 622. Moreover, if the offset amount of the offset signal Sos2 is −2, then for the selection unit 625 of the delay section unit 63, the selection control unit 61 creates and supplies thereto such a selection control signal Ssel2 that allows the selection unit 625 concerned to select the pixel data based on the motion vector −MV/2 while taking, as the reference position, a position of pixel data outputted from the flip-flop 606.

In response to the offset amounts of the offset signals Sos1 and Sos2, the selection control unit 61 shifts the positions of the pixel data in the vertical direction, which are taken as such references, in the delay selection units 62 and 63. As a result, the pixel data selected and outputted by the selection unit 625 in response to the motion vectors MV/2 and −MV/2 is shifted in the vertical direction.

Selected pixel data Psel1 is outputted from the selection unit 625 of the delay selection unit 62, and selected pixel data Psel2 is outputted from the selection unit 625 of the delay selection unit 63. A mixing unit 64 mixes the pixel data Psel1 and Psel2 with each other, and creates interpolated pixel data Pi. The mixing unit 64 just needs to mix both of the pixel data Psel1 and Psel2 with each other so as to take an average therebetween. The interpolated pixel data Pi corresponds to the interpolated pixel Pf12(0) in FIG. 2.

The video signal S1 is inputted as an actual frame signal to a time-series conversion memory 7, and the interpolated pixel data Pi sequentially outputted from the mixing unit 64 is inputted as interpolated frame signals to the time-series conversion memory 7. The time-series conversion memory 7 reads out pixel data of such frame actual frame signals and the interpolated pixel data Pi of the interpolated frame signals alternately with each other at a vertical frequency of 120 Hz, and thereby outputs video signals subjected to frame rate conversion.

Figure 5:
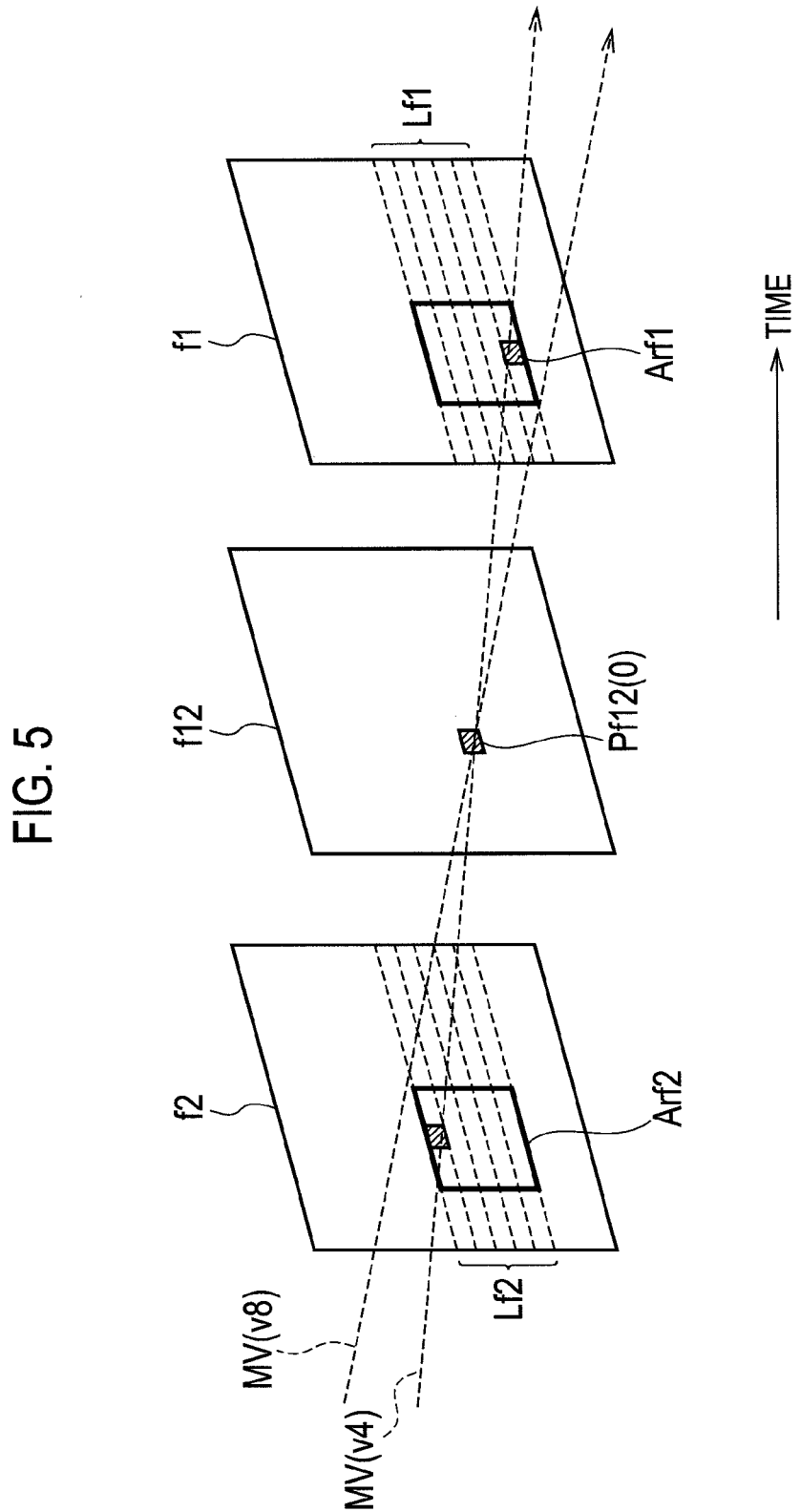
FIG. 5 is a conceptual view for explaining an interpolated pixel creation operation in a case where a read address in a vertical direction in each of frame memories 2 and 3 is not shifted.
Figure 6:
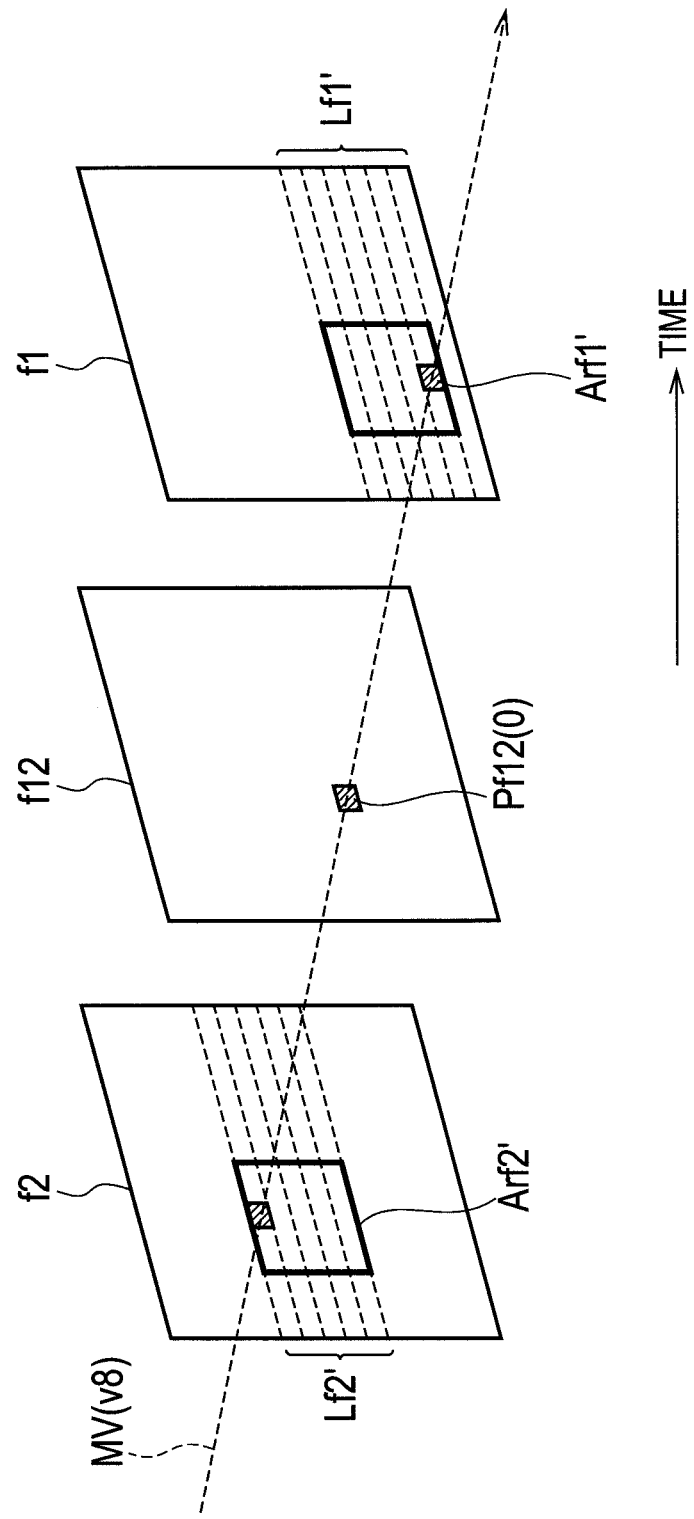
FIG. 6 is a conceptual view for explaining an interpolated pixel creation operation in a case where the read address in the vertical direction in each of the frame memories 2 and 3 is shifted.

By using FIG. 5 and FIG. 6, a description is made of the shift of the read address in the vertical direction in each of the frame memories 2 and 3. FIG. 5 conceptually shows the interpolated pixel creation in the case where the offset amounts of the offset signals Sos1 and Sos2 are 0. In the case of creating the interpolated pixel Pf12(0) as the pixel in the interpolated frame f12, the pixel to be referred to in the frame f1 of the video signal S1 is a pixel in a region Arf1 as the reference range, and the pixel to be referred to in the frame f2 of the video signal S2 is a pixel in a region Arf2 as the reference range. In the first embodiment, the number of lines Lf1 of the region Arf1 and the number of lines Lf2 of the region Arf2 are five. The motion vector MV in which the vertical component is four pixels is defined as MV(v4), and the motion vector MV in which the vertical component is eight pixels is defined as MV(v8).

As shown in FIG. 5, if the motion vector MV detected by the motion vector detection unit 1 is the motion vector MV(v4), then the interpolated pixel Pf12(0) can be created by using such pixels in the region Arf1 and Arf2. In the case where the motion vector MV is the motion vector MV(v8), then the pixels in the frames f1 and f2, which serve for creating the interpolated pixels Pf12(0), are located out of the ranges of the regions Arf1 and Arf2. Hence, the interpolated pixel creation unit 6 cannot create the interpolated pixel Pf12(0).

Accordingly, in the first embodiment, as mentioned above, the offset signals Sos1 and Sos2 with the predetermined offset amount are supplied to the frame memories 2 and 3 to thereby shift the read addresses in the vertical direction, and in addition, the reference positions in the vertical direction in the delay selection units 62 and 63 are shifted. As a result, as shown in FIG. 6, the region Arf1 moves to a position indicated by a region Arf1' shifted downward in the vertical direction in comparison with FIG. 5, and the region Arf2 moves to a position indicated by a region Arf2' shifted upward in the vertical direction in comparison with FIG. 5. The number of lines Lf1' of the region Arf1' and the number of lines Lf2' of the region Arf2' are five. As shown in FIG. 6, even if the motion vector MV is the motion vector MV(v8), the pixels in the frames f1 and f2, which serve for creating the interpolated pixel Pf12(0), are located within the ranges of the regions Arf1' and Arf2', and the interpolated pixel creation unit 6 becomes capable of creating the interpolated pixel Pf12(0).

Figure 7A:
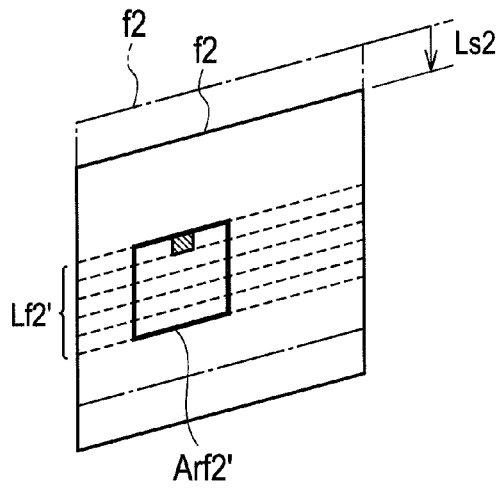
FIGS. 7A and 7B are views for explaining the shift of the read address in the vertical direction in each of the frame memories 2 and 3.
Figure 7B:
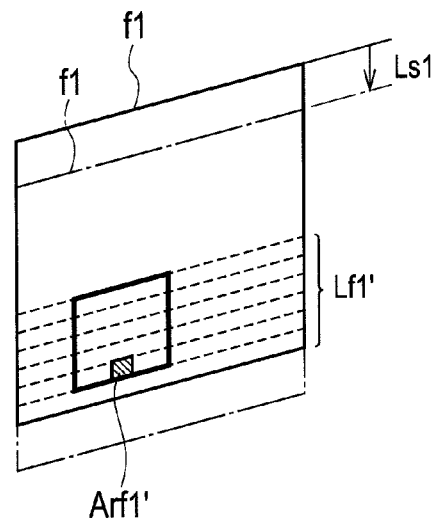

For the sake of convenience, in FIG. 6, illustration is made so that the region Arf1 can be shifted downward in the vertical direction to thereby turn to the region Arf1', and that the region Arf2 can be shifted upward in the vertical direction to thereby turn to the region Arf2'. Actually, as shown in FIG. 7A and FIG. 7B, the read addresses in the vertical direction for the pixel data from the frame memories 2 and 3 are shifted. Such a frame f2 shown by an alternate long and short dash line in FIG. 7A conceptually shows a state where the read address is not shifted, and such a frame f1 shown by an alternate long and short dash line in FIG. 7B conceptually shows a state where the read address is not shifted.

In the case where the offset amounts of the offset signals Sos1 and Sos2 are 0, and the read addresses are not shifted, then the pixel data from each of the frame memories 2 and 3 is read out at timing shown by each of the alternate long and short dash lines. Such a frame f2 shown by a solid line in FIG. 7A conceptually shows a state where the read address is shifted, and such a frame f1 shown by a solid line in FIG. 7B conceptually shows a state where the read address is shifted. If the offset amounts are predetermined values exceeding 0, then the pixel data from the frame memories 2 and 3 are read out at such pieces of the timing shown by the frames f1 and f2 indicated by the solid lines. Note that, in FIG. 7A and FIG. 7B, the illustration is made while exaggerating the shift amounts for the purpose of facilitating the understanding.

In the above-mentioned example, the offset amount by the offset signal Sos1 is 2, and accordingly, the frame memory 2 shifts the read address upward by the number of lines Ls1, which is equivalent to the offset amount 2 (that is, by two lines). Moreover, the offset amount by the offset signal Sos2 is −2, the frame memory 3 shifts the read address downward by the number of lines Ls2, which is equivalent to the offset amount −2 (that is, by two lines).

As a result, the range of the pixel to be referred to in the delay selection unit 62 is shifted downward in the vertical direction from the region Arf1 shown in FIG. 5 to the region Arf1' shown in FIG. 6, and the range of the pixel to be referred to in the delay selection unit 63 is shifted downward in the vertical direction from the region Arf2 shown in FIG. 5 to the region Arf2' shown in FIG. 6. Note that the downward or upward shift of each read address in the vertical direction can be easily realized by shifting a reading start position and reading end position of each of the video signals S1 and S2 to a blanking period.

Figure 8:
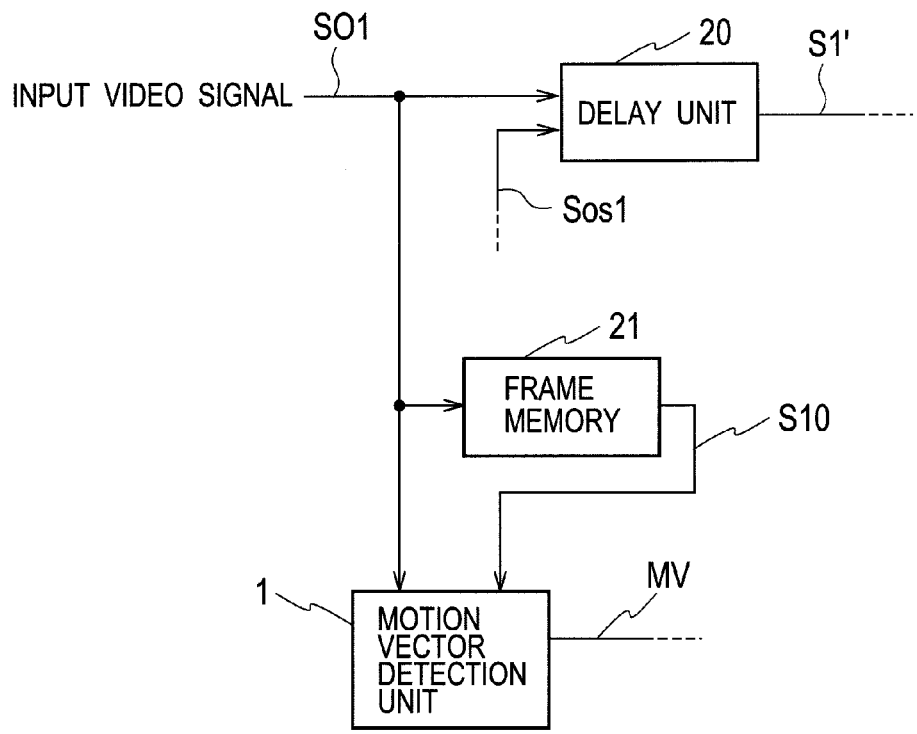
FIG. 8 is a partial block diagram showing a modification configuration of FIG. 1.

In FIG. 1, the input video signal S0 is delayed by one frame period by the frame memory 2, whereby the video signal S1 is created; however, the input video signal S0 may be delayed by a period of less than one frame. FIG. 8 shows a configuration in the case of using a delay unit 20, which delays the input video signal by the period of less than one frame, in place of the frame memory 2. The delay unit 20 can be composed of a plurality of line memories. The delay unit 20 delays the input video signal S0 by the period of less than one frame, and outputs the delayed video signal as a video signal S1'. The video signal S1' is supplied to the delay selection unit 62.

In this case, to the motion vector detection unit 1, it is necessary to input two frame signals separated from each other by one frame period, and accordingly, a frame memory 21 is provided. The frame memory 21 delays the input video signal S0 by one frame period, and outputs the delayed input video signal S0 as a video signal S10. The motion vector detection unit 1 detects the motion vector MV based on the input video signal S0 and the video signal S10. As described above, the video signal to be supplied to the delay selection unit 62 is not limited to the video signal S1 obtained by delaying the input video signal S0 by one frame period.

In the above, the description has been made of the case where the vertical component of the motion vector MV is an even number. In the case where the vertical component is an odd number, the following manner just needs to be employed. The selection unit 625 in each of the delay selection units 62 and 63 just needs to take the average between two pixel data adjacent to each other in the vertical direction, and to output averaged pixel data as each of the image data Psel1 and Psel2. The same is also applied to the case where a horizontal component of the motion vector MV is an odd number, and the selection unit 625 just needs to take the average between two pixel data adjacent to each other in the horizontal direction, and to output averaged pixel data as each of the image data Psel1 and Psel2.

Moreover, in the case where the vertical component of the motion vector MV is an odd number, the offset control unit 5 just needs to obtain the offset amount based on an even number value larger by one than the odd number in the case where a value of the odd number is positive, and to obtain the offset amount based on an even number value smaller by one than the odd number in the case where the value of the odd number is negative. That is to say, in FIG. 3, in the case where the vertical component of the motion vector MV is 1, 3, 5 or 7, then the offset amount is obtained while turning the vertical component to 2, 4, 6 or 8, respectively, and in the case where the vertical component of the motion vector MV is −1, −3, −5 or −7, then the offset amount is obtained while turning the vertical component to −2, −4, −6 or −8, respectively.

As described above, in the case where the vertical component of the motion vector MV is an odd number, the offset control unit 5 substitutes an even number for the odd number, and obtains the offset amount, and the delay selection units 62 and 63 output the averaged pixel data as the pixel data Psel1 and Psel2 corresponding to the case where the vertical component of the motion vector MV is an odd number. In such a way, even in the case where the vertical component of the motion vector MV is an odd number, similar processing to the case where the vertical component of the motion vector MV is an even number can be performed.

Incidentally, in the first embodiment, in the case where, from a state where the frequency does not exceed the threshold value y in the specific class CLsp and the values of the offset signals Sos1 and Sos2 are 0, the frequency exceeds the threshold value y in the specific class CLsp and the values of the offset signals Sos1 and Sos2 become predetermined values, or alternatively, in the case opposite thereto, preferably, the state is not rapidly changed between the state where the read addresses for the video signals S1 and S2 from the frame memories 2 and 3 are not shifted and the state where the read addresses concerned are shifted. Preferably, the offset control unit 5 sequentially changes the values of the offset signals Sos1 and Sos2 by every one or plural frames. For example, in the case where the offset amount is changed from 0 to 2, the offset amount just needs to be set at 1 in a frame next to the frame where it is detected that the frequency exceeds the threshold value y, and further, the offset amount just needs to be set at 2 in a frame next thereto.

In accordance with the video signal processing apparatus and method of the first embodiment, the range of the interpolation processing can be expanded while suppressing the increase of the line memories, and the appropriate interpolated pixels can be created based on the motion vectors even in the case where the motion of the image in the vertical direction is large.

[Second Embodiment]

Figure 9:
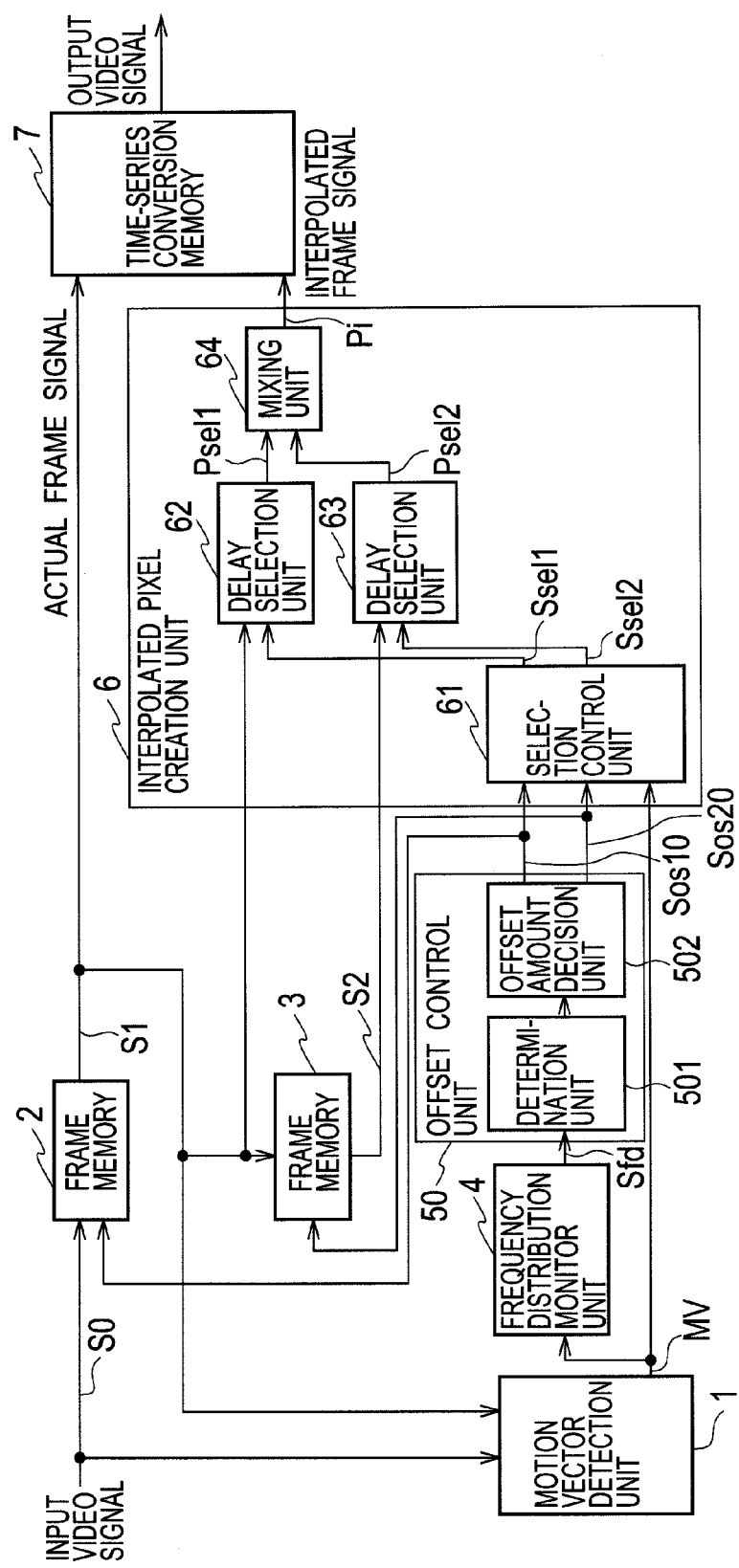
FIG. 9 is a block diagram showing a second embodiment.
Figure 10:
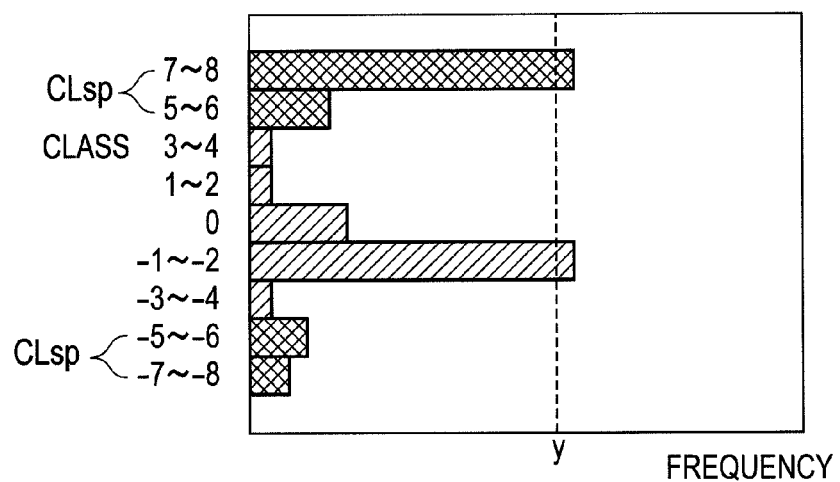
FIG. 10 is a chart for explaining a motion vector in the second embodiment.
Figure 11:
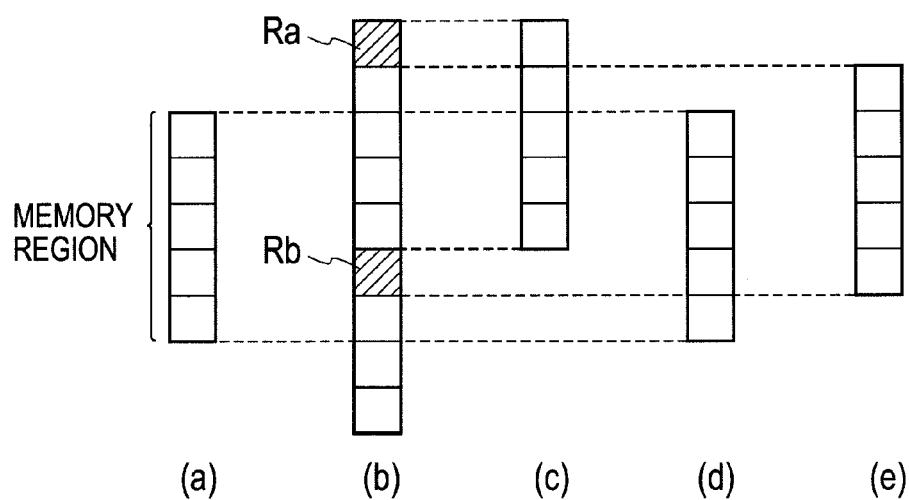
FIG. 11 is a view for explaining operations in the second embodiment.

A description is made of a configuration and operations of a second embodiment by using FIG. 9 to FIG. 11. In FIG. 9, the same reference numerals are assigned to the same portions as those in FIG. 1, and a description thereof is omitted. In FIG. 9, an offset control unit 50 is provided in place of the offset control unit 5 of FIG. 1. The offset control unit 50 includes a determination unit 501 and an offset amount decision unit 502.

In the second embodiment, as shown in FIG. 10, the offset control unit 50 defines, as the specific classes CLsp, the class of 5, 6, the class of 7, 8, the class of −5, −6, and the class of −7, −8. An example shown in FIG. 10 shows a state where the frequency exceeds the threshold value y in the class of 7, 8 as the specific class CLsp, and the frequency exceeds the threshold value y also in the class of −1, −2, which is not the specific class CLsp, and has an opposite motion direction in the vertical direction to that of the class of 7, 8. The determination unit 501 determines a state where the frequency exceeds the threshold value y in any class in the specific classes CLsp, and in addition, where the frequency exceeds the threshold value y in a class other than the specific classes CLsp, the class concerned having an opposite motion direction in the vertical direction to that of such any specific class CLsp in which the frequency exceeds the threshold value y.

In the case of having determined the above-described state, the determination unit 501 inputs, to the offset amount decision unit 502, a value of a vertical component of the specific class CLsp in which the frequency exceeds the threshold value y, and a value of a vertical component of the class in which the frequency exceeds the threshold value y, the class concerned being other than the specific classes CLsp. In the example of FIG. 10, the offset amount decision unit 502 adds 8 as a value of the vertical component of the specific class CLsp in which the frequency exceeds the threshold value y and −2 as a value of the vertical component of the class in which the frequency exceeds the threshold value y, the class being other than the specific classes CLsp, to each other, and calculates, as six pixels, the number of pixels in the vertical direction. Hence, vertical components of motion vectors for use in the interpolated pixel creation unit 6 become +3 pixels and −3 pixels.

Note that, in the case where the frequency exceeds the threshold value y in the class of 7, 8 and the class of 5, 6, and the frequency exceeds the threshold value y also in the class of −1, −2, then the class of 7, 8 as a class in which a size of the vertical component is largest is taken as a reference. That is to say, also in this case, 8 and −2 are added to each other, and the number of pixels in the vertical direction is calculated as six pixels.

Then, in a similar way to the first embodiment, a selection range of the pixel data in the vertical direction in the case where the position of the pixel data outputted from the flip-flop 614 is taken as the reference position is +2 pixels and −2 pixels, and accordingly, the offset amount decision unit 502 just needs to set, at 1, an offset amount of an offset signal Sos10, and to set, at −1, an offset amount of an offset signal sos20.

By using FIG. 11, a description is made of effects brought by the second embodiment. (a) of FIG. 11 shows a memory region in the vertical direction in each of the delay selection units 62 and 63. The memory region corresponds to each of the numbers of lines Lf1 and Lf2 of the regions Arf1 and Arf2 described with reference to FIG. 5. As shown in (b) of FIG. 11, the class of 7, 8 is located at a position denoted by reference symbol Ra, and the class of −1, −2 is located at a position denoted by reference symbol Rb. (c) of FIG. 11 shows a state where the shift described in the first embodiment is performed.

As understood from (c) of FIG. 11, when the shift described in the first embodiment is performed, it becomes possible to create the interpolated pixel data Pi in which the vertical component of the motion vector MV is located at the class of 7, 8; however, the class of −1, −2 departs from the memory region, and accordingly, it becomes impossible to create the interpolated pixel data for the class of −1, −2. (d) of FIG. 11 shows a state where the shift is not performed. In the case of (d) of FIG. 11, the interpolated pixel data Pi for the class of −1, −2 can be created; however, the interpolated pixel data Pi for the class of 7, 8 cannot be created.

Originally, the motion in the class of −1, −2 is a motion in the range where the interpolated pixel data Pi can be created in the interpolated pixel creation unit 6, and it is preferable to create the interpolated pixel data Pi for the class of −1 and −2. For the motion in the range where the interpolated pixel data Pi can be created in the state where the shift is not performed, it is desirable to create the interpolated pixel data Pi. Accordingly, in the second embodiment, in order to make it possible to deal with the motion in the class of −1, −2, and in order to also deal, as much as possible, with the motion exceeding the memory region, the offset amount is set at 1 (and −1) as shown in (e) of FIG. 11.

In accordance with the shift shown in (e) of FIG. 11, the interpolated pixel data Pi for the class of −1, −2 can be created. Although the interpolated pixel data Pi for the class of 7, 8 cannot be created, the interpolated pixel data Pi for the class of 5, 6, which is close to the class of 7, 8, and has a motion that cannot be dealt with in accordance with (d) of FIG. 11, can be created.

Also in the second embodiment, preferably, the offset control unit 50 sequentially changes the values of the offset signals Sos10 and Sos20 by every one or plural frames.

[Third Embodiment]

Figure 12:
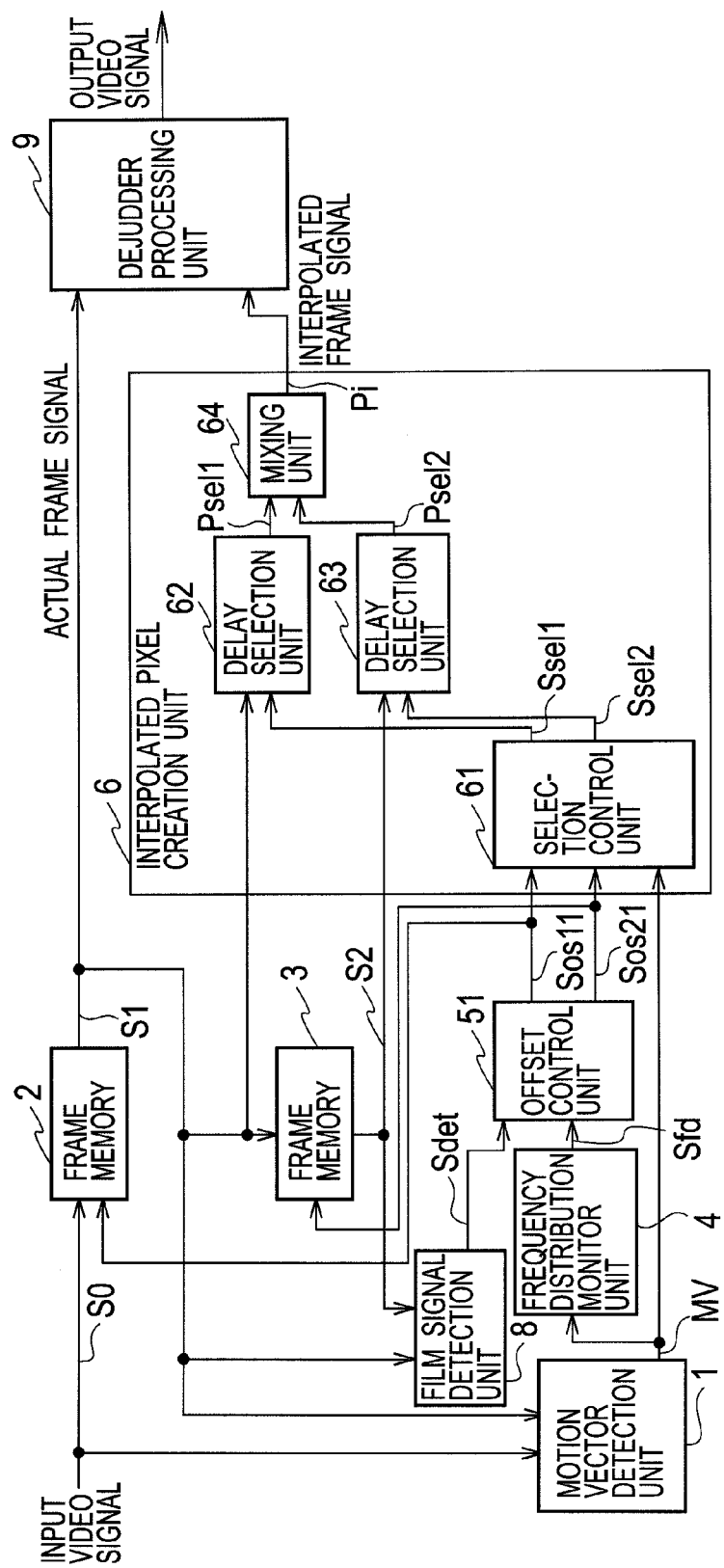
FIG. 12 is a block diagram showing a third embodiment.
Figure 13A:
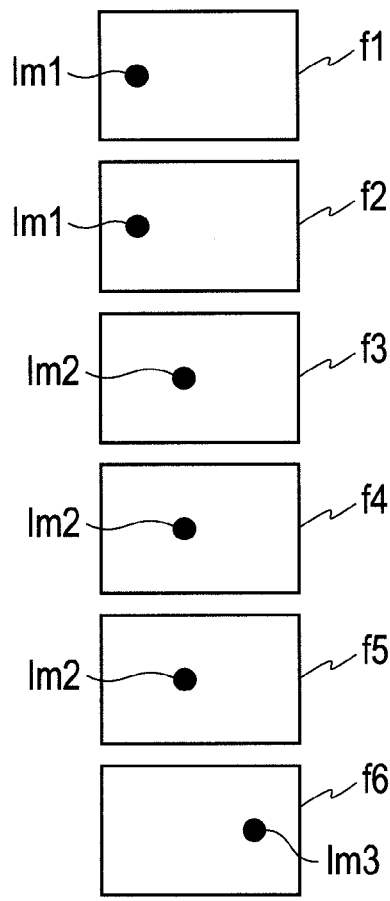
FIGS. 13A and 13B are views for explaining video signals of 2-3 pull down and dejudder processing therefor.
Figure 13B:
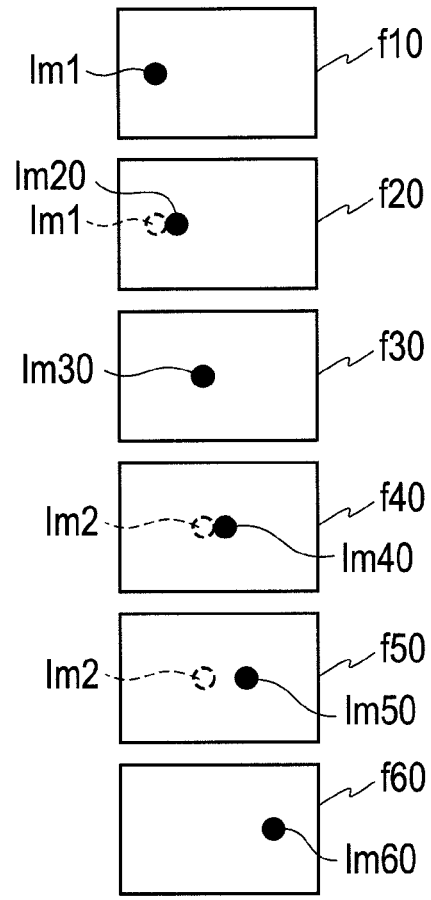
Figure 14:
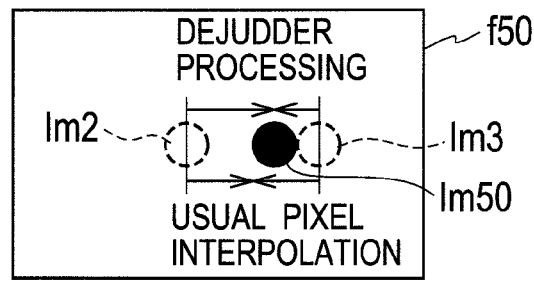
FIG. 14 is a view for explaining pixel interpolation of the dejudder processing.

A description is made of a configuration and operations of a third embodiment by using FIG. 12 to FIG. 14. In FIG. 12, the same reference numerals are assigned to the same portions as those in FIG. 1, and a description thereof is omitted. The third embodiment shown in FIG. 12 takes a dejudder processing apparatus as an example.

In FIG. 12, the video signals S1 and S2 are inputted to a film signal detection unit 8. Based on the video signals S1 and S2, the film signal detection unit 8 detects whether or not the input video signal S0 is a video signal in which a frequency of a film image is converted into the vertical frequency of 60 Hz by 2-2 pull down or 2-3 pull down. If the film image has 30 frames, then the film image can be converted into an image with a frame rate of 60 frames by the 2-2 pull down, and the film image has 24 frames, then the film image can be converted into an image with the frame rate of 60 frames by the 2-3 pull down.

In the case where the input video signal S0 is a video signal created by the 2-3 pull down, then as can be understood from FIG. 13A, the same image is formed in two frames, the same image is formed in three frames next thereto, and the same image is formed in two frames further next thereto. In frames f1 to f6 shown in FIG. 13A, the same image Im1 is formed in the frames f1 and f2, the same image Im2 is formed in the frames f3 to f5, and the same image Im3 is formed in the frame f6 and a frame that is not shown and next thereto. The film signal detection unit 8 creates a detection signal Sdet indicating whether or not the input video signal S0 is the video signal converted by the 2-2 pull down or the 2-3 pull down, and inputs the created detection signal Sdet to the offset control unit 51.

For example, in the case of having detected that the input video signal S0 is not the video signal subjected to such pull-down conversion, the film signal detection unit 8 outputs a value "0" as the detection signal Sdet, and in the case of having detected that the input video signal S0 is the video signal subjected to the pull-down conversion, the film signal detection unit 8 outputs a value "1" as the detection signal Sdet. In the case where the input video signal S0 is the video signal subjected to the pull-down conversion, preferably, the film signal detection unit 8 distinguishes and detects whether such a conversion mode is the 2-2 pull down or the 2-3 pull down. In the case of distinguishing both of them from each other, for example, the film signal detection unit 8 just needs to output a value "00" as the detection signal Sdet in the case of having detected that the input video signal S0 is not the video signal subjected to the pull-down conversion, to output a value "01" as the detection signal Sdet in the case of having detected that the conversion mode is the 2-2 pull down, and to output a value "10" as the detection signal Sdet in the case of having detected that the conversion mode is the 2-3 pull down.

As understood from FIG. 13A, in the video signal converted by the 2-2 pull down or the 2-3 pull down, the motion of the image is not smooth. In order to smooth the motion of the image, as shown in FIG. 13B, the dejudder processing is sometimes performed. A frame f10 shown in FIG. 13B is the same as the frame f1. An image Im10 is the same as an image Im1. In a frame f20, an image Im20 is created at a position at an equal interval from the image Im1 and an image Im2 between the image Im1 and the image Im2. A frame f30 is the same as the frame f3, and an image Im30 is the same as the image Im2.

In a frame f40, an image Im40 is created at a position of ⅓ from a position of the image Im2 between the image Im2 and the image Im3. In a frame f50, an image Im50 is created at a position of ⅔ from the position of the image Im2 between the image Im2 and the image Im3. A frame f60 is the same as the frame f6, and an image Im60 is the same as an image Im3. The video signal in FIG. 13A is converted as in FIG. 13B, whereby the motion of the image can be smoothed.

FIG. 14 conceptually shows interpolation processing in the case of creating the image Im50 of the frame f50. In the usual pixel interpolation, the interpolated pixel is created at a center between two pixels adjacent to each other, and meanwhile, in the dejudder processing, as understood also from the above description, the interpolated pixel is sometimes created at a position biased to one of such two adjacent pixels. In FIG. 14, interpolation in the horizontal direction is shown; however, the same is also applied to interpolation in the vertical direction. In the case of performing the dejudder processing, such a case occurs, where the offset becomes short by the offset amounts of the offset signals Sos1 and Sos2 described in the first embodiment.

Accordingly, in the third embodiment, in the case where the detection signal Sdet outputted from the film signal detection unit 8 has the value indicating that the input video signal is the video signal converted by the 2-2 pull down or the 2-3 pull down, the offset control unit 51 outputs, as the offset signals Sos1 and Sos2, offset amounts increased more than the offset amounts in the first embodiment. For example, in the case where the detection signal Sdet is the value "1" or the value "01" or "10", the offset amounts are increased by 50%. If the offset amounts in the case where the pull down is not performed are 2 and −2, then the offset amounts in the case where the pull down is performed become 3 and −3.

In the case of distinguishing the 2-2 pull down and the 2-3 pull down from each other, preferably, an extent of the increase of the offset amounts in the case where the 2-3 pull down is performed is made larger than an extent of the increase of the offset amounts in the case where the 2-2 pull down is performed. For example, the offset amounts are increased by 50% in the case where the 2-2 pull down is performed, and the offset amounts are increased by 60% in the case where the 2-3 pull down is performed. If the offset amounts in the case where the pull down is not performed are 2 and −2, then the offset amounts in the case where the 2-2 pull down is performed become 3 and −3, and the offsets amounts in the case where the 2-3 pull down is performed become 4 and −4 by rounding up figures after decimal fractions. In the case where the 2-3 pull down is performed, the offset amounts may be increased by a ratio exceeding 60%.

Offset signals Sos11 and sos21 are increased more than in the case of the first embodiment, whereby the Psel1 and Psel2 selected and outputted by the delay selection units 62 and 63 based on the selection control signals Ssel1 and Ssel2 will also be shifted to positions in the vertical direction, which are different from those in the case of the first embodiment.

Note that, in the case where the offset amounts before being increased have an upper limit value of the offset amounts or a value approximate thereto, then the offset amounts will exceed the upper limit value according to calculations if the offset amounts are increased by 50% or 60% as described above. In this case, the offset amounts are clipped, and accordingly, the offset amounts are not increased even if the input video signal is the video signal converted by the pull down. Moreover, in some case, the offset amounts are not increased in the case of omitting the figures after the decimal fractions according to calculations.

In FIG. 12, the dejudder processing unit 9 alternately reads out the pixel data of the actual frame signals and the interpolated pixel data Pi of the interpolated frame signals at the vertical frequency of 60 Hz, thereby outputting the video signal subjected to the dejudder processing. The dejudder processing unit 9 can be composed of a memory. In the third embodiment, the dejudder processing apparatus including the dejudder processing unit 9 is taken as an example; however, the frame rate conversion device may be used in a similar way to the first and second embodiments.

Also in the third embodiment, preferably, the offset control unit 51 sequentially changes the values of the offset signals Sos11 and Sos21 by every one or plural frames.

[Fourth Embodiment]

Figure 15:
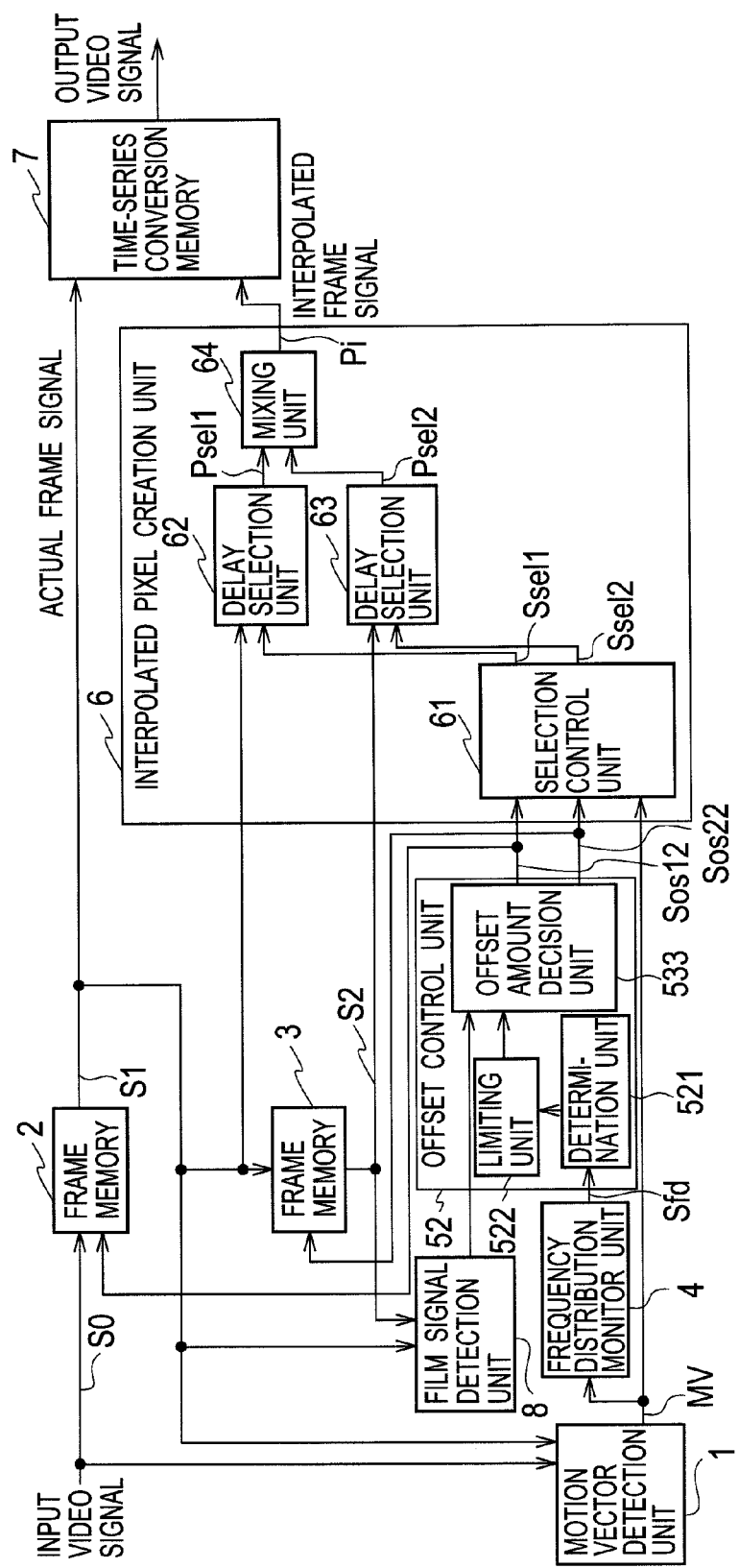
FIG. 15 is a block diagram showing a fourth embodiment.

A description is made of a configuration and operations of a fourth embodiment by using FIG. 15. In FIG. 15, the same reference numerals are assigned to the same portions as those in FIG. 1 and FIG. 12, and a description thereof is omitted. The fourth embodiment corresponds to the one obtained by combining the second embodiment and the third embodiment with each other. In FIG. 15, an offset control unit 52 includes a determination unit 521, a limiting unit 521, and an offset amount decision unit 533. As described in the description of the determination unit 501 of FIG. 9, the determination unit 521 determines a state where the frequency exceeds the threshold value y in the specific class CLsp, and in addition, where the frequency exceeds the threshold value y in a class other than the specific class CLsp, the class concerned having an opposite motion direction in the vertical direction to that of the specific class CLsp in which the frequency exceeds the threshold value y.

In the case where the determination unit has determined the above-described state, then in a similar way to the second embodiment, the limiting unit 522 adds a value of the vertical component of the specific class CLsp in which the frequency exceeds the threshold value y and a value of the vertical component of the class in which the frequency exceeds the threshold value y, the class being other than the specific class CLsp, to each other, and calculates the number of pixels in which the number of pixels in the vertical direction is limited. The number of pixels, which is calculated by the limiting unit 522, is inputted to the offset amount decision unit 533. To the offset amount decision unit 533, a detection signal Sdet outputted from the film signal detection unit 8 is inputted.

In the case where the detection signal Sdet does not have a value indicating that the pull down is performed, the offset amount decision unit 533 outputs offset signals Sos12 and Sos22, which have offset amounts based on the limited number of pixels, the limited number being inputted from the limiting unit 522. In the case where the detection signal Sdet has the value indicating that the pull down is performed, the offset amount decision unit 533 outputs offset signals Sos12 and Sos22 which have increased offset amounts based on the limited number of pixels, the limited number being inputted from the limiting unit 522.

Meanwhile, in the case where the determination unit 521 does not determine the above-described state, and the limiting unit 522 does not limit the number of pixels in the vertical direction, and inputs the number of pixels, which is similar to that of the first embodiment, to the offset amount decision unit 533, then based on the unlimited number of pixels, the offset amount decision unit 533 decides the offset amounts based on whether or not the detection signal Sdet has the value indicating that the pull down is performed, and outputs the offset signals Sos12 and Sos22.

Also in the fourth embodiment, preferably, the offset control unit 51 sequentially changes the values of the offset signals Sos12 and Sos22 by every one or plural frames.

[Fifth Embodiment]

Figure 16:
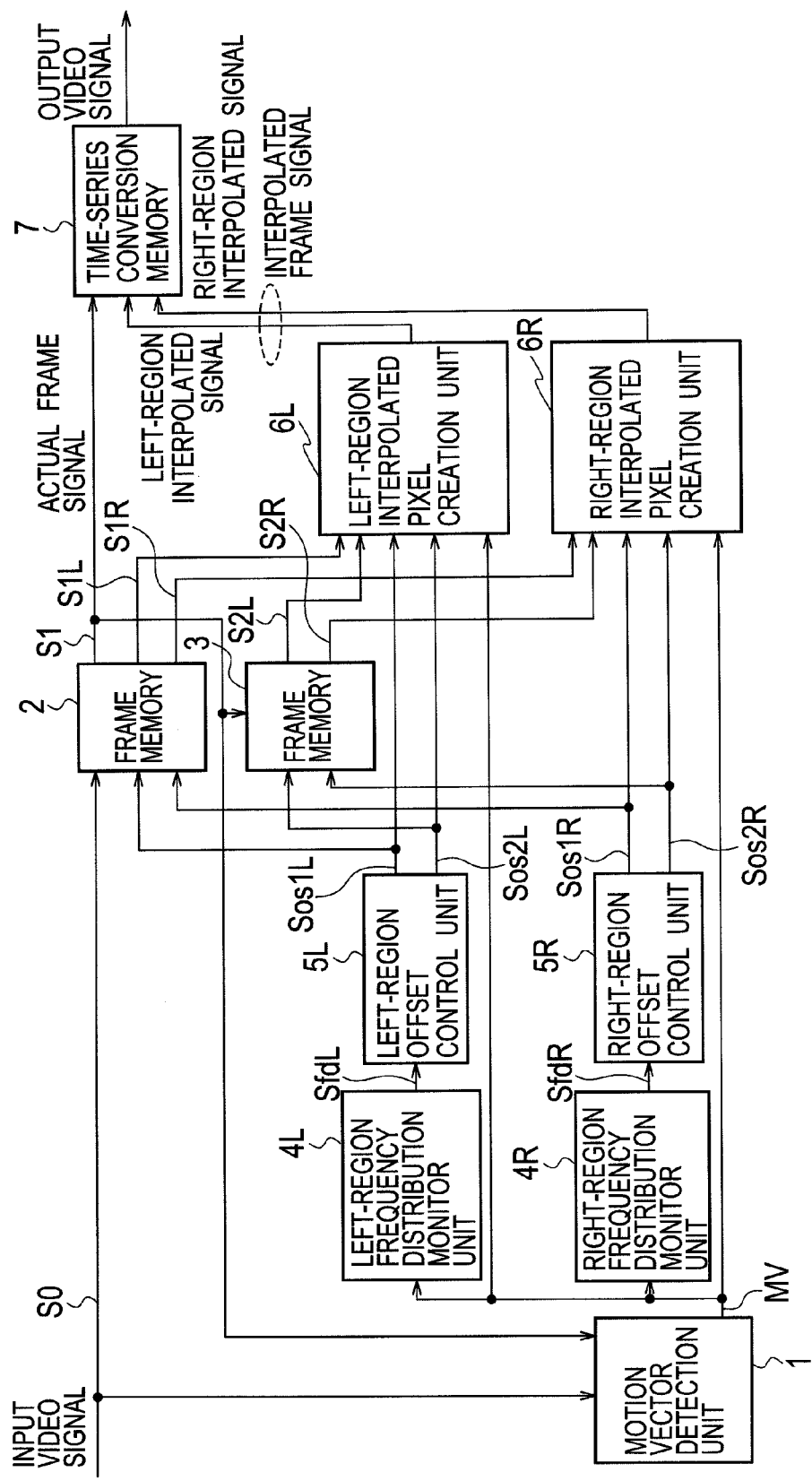
FIG. 16 is a block diagram showing a fifth embodiment.

A description is made of a configuration and operations of a fifth embodiment by using FIG. 16 to FIG. 20. In FIG. 16, the same reference numerals are assigned to the same portions as those in FIG. 1, and a description thereof is omitted as appropriate. In each of the first to fourth embodiments, the frequency distribution monitor unit 4 monitors the motion vector MV, for example, in the frame unit, thereby detects how large the vertical component of the motion vector MV is and how the vertical component concerned is distributed, and creates the data Sfd indicating the frequency distribution. In the case where the image moves similarly in the whole of one frame, then based on the data Sfd indicating the frequency distribution, it is detected that the frequency exceeds the threshold value y in the specific class CLsp, and the read addresses in the vertical direction in the frame memories 2 and 3 are shifted.

For example, in the case where so-called two-screen display, in which video signals different from each other are displayed on right and left of a screen of an image display device, is performed, then the motion of the image differs between right and left. Accordingly, even if the motion vector MV is monitored in the whole of one frame, and the histogram is taken as described with reference to FIG. 3, such a case occurs where the frequency does not exceed the threshold value y in the specific class CLsp. In this case, the read addresses in the vertical direction in the frame memories 2 and 3 are not shifted, and the effect that the range of the interpolation processing is expanded is not exerted. Without being limited to the two-screen display, such a fact occurs in a similar way in the case of an image that moves differently between right and left in one frame even in the case where one video signal is displayed.

The fifth embodiment is an embodiment obtained by developing the configuration of the first embodiment so that the effect that the range of the interpolation processing is expanded can be exerted even in the case where the motion of the image differs between a plurality of regions. Here, a configuration obtained by developing the configuration of the first embodiment is described as the fifth embodiment; however, also for the second to fourth embodiments, it is possible to adopt a similar configuration to that of the fifth embodiment. In the fifth embodiment, as an example, video signals are processed in the respective regions obtained by equally dividing one frame into right and left halves. The video signals may be processed not by equally dividing one frame but by dividing one frame so that areas of such regions thus divided can differ from each other.

In FIG. 16, the motion vector MV outputted from the motion vector detection unit 1 is inputted to a left-region frequency distribution monitor unit 4L and a right-region frequency distribution monitor unit 4R, and to a left-region interpolated pixel creation unit 6L and a right-region interpolated pixel creation unit 6R. In a similar way to the frequency distribution monitor unit 4, the left-region frequency distribution monitor unit 4L and the right-region frequency distribution monitor unit 4R monitor the motion vector MV, for example, in the frame unit, and detects how large the vertical component of the motion vector MV is and how the vertical component concerned is distributed. However, the left-region interpolated pixel creation unit 6L monitors such a motion vector MV only in the left region of one frame, and the right-region interpolated pixel creation unit 6R monitors such a motion vector MV only in the right region of one frame.

Figure 17A:
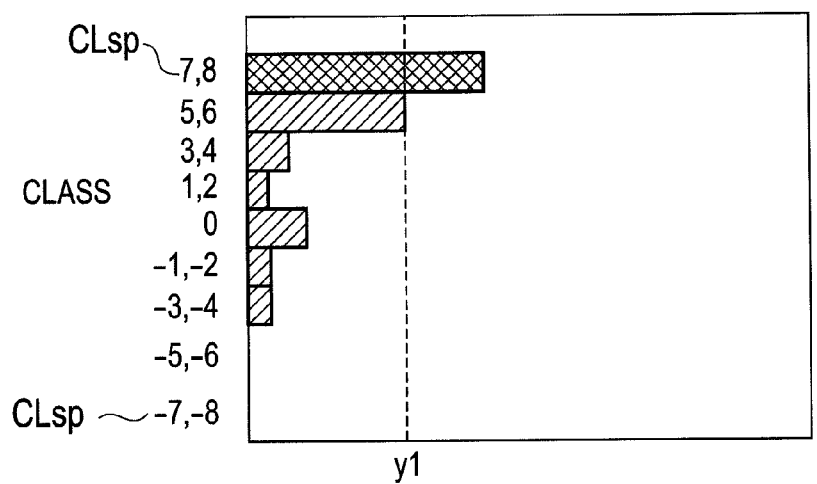
FIG. 17A, FIG. 17B and FIG. 17C are views showing examples of histograms of frequency distributions detected by frequency distribution monitor units 4L and 4R in the fifth embodiment.
Figure 17B:
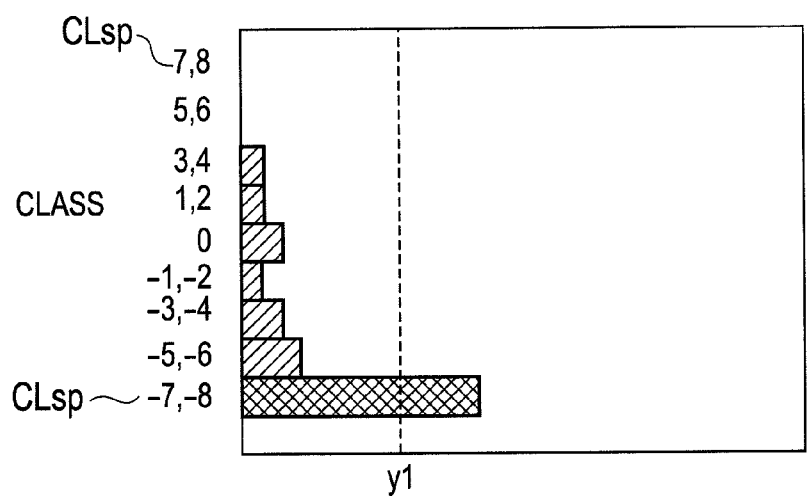

FIG. 17A is an example of a histogram showing a distribution of the motion vectors MV created by the left-region frequency distribution monitor unit 4L, and FIG. 17B is an example of a histogram showing a distribution of the motion vectors MV created by the right-region frequency distribution monitor unit 4R. Setting for classes of the motion vectors MV is the same as that in FIG. 3. The left-region frequency distribution monitor unit 4L supplies data SfdL, which indicates the frequency distribution in the left region, to a left-region offset control unit 5L, and the right-region frequency distribution monitor unit 4R supplies data SfdR, which indicates the frequency distribution in the right region, to a right-region offset control unit 5R. As shown in FIG. 17A and FIG. 17B, also here, the class of 7, 8 and the class of −7, −8 are defined as the specific classes CLsp.

Figure 17C:
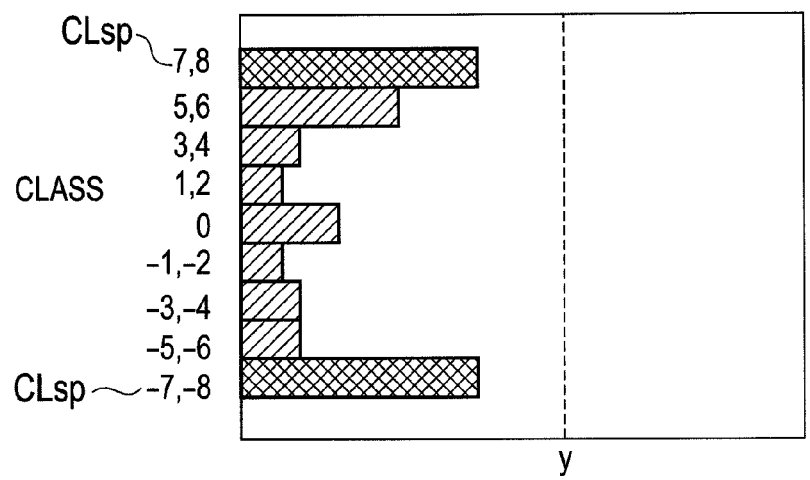

For comparison with FIG. 17A and FIG. 17B, FIG. 17C shows a histogram created not by dividing one frame into right and left halves but by monitoring the motion vectors MV in the whole of one frame in a similar way to the first embodiment.

In the case where the frequency exceeds a threshold value y1 in the specific class CLsp in the frequency distribution shown in FIG. 17A, the left-region offset control unit 5L creates offset signals Sos1L and Sos2L, each of which indicates a predetermined offset amount in which an absolute value exceeds 0. In the case where the frequency exceeds the threshold value y1 in the specific class CLsp in the frequency distribution shown in FIG. 17B, the right-region offset control unit 5R creates offset signals Sos1R and Sos2R, each of which indicates a predetermined offset amount in which an absolute value exceeds 0. In the fifth embodiment, the left-region offset control unit 5L and the right-region offset control unit 5R set the threshold value y1 that is a smaller value than the threshold value y shown in FIG. 3 and FIG. 17C. This is because, since one frame is divided into right and left halves, the number of occurrences of each class of the vertical component of the motion vector MV in each of the right and left regions becomes smaller than the number of occurrences thereof when the motion vector MV is monitored in the whole of one frame.

In the case of FIG. 17C, the frequency does not exceed the threshold value y in the specific classes CLsp. In each case of FIG. 17A and FIG. 17B, the threshold value y1 that is a smaller value than the threshold value y is set, and accordingly, the frequency exceeds the threshold value y1 in the specific class CLsp.

The offset signals Sos1L and Sos2L are inputted to the frame memories 2 and 3 and the left-region interpolated pixel creation unit 6L, and the offset signals Sos1R and Sos2R are inputted to the frame memories 2 and 3 and the right-region interpolated pixel creation unit 6R. In response to the offset amount, the offset signals Sos1L and Sos2L shift, in directions opposite to each other, the read addresses in the vertical direction in the frame memories 2 and 3. In response to the offset amount, the offset signals Sos1R and Sos2R shift, in directions opposite to each other, the read addresses in the vertical direction in the frame memories 2 and 3.

Internal configurations of the left-region interpolated pixel creation unit 6L and the right-region interpolated pixel creation unit 6R are the same as that of the interpolated pixel creation unit 6. As described with reference to FIG. 1, each of the left-region interpolated pixel creation unit 6L and the right-region interpolated pixel creation unit 6R includes a selection control unit 61, delay selection units 62 and 63, and a mixing unit 64. Specific configurations of the delay selection units 62 and 63 are as described with reference to FIG. 4.

The frame memory 2 supplies a video signal S1L, which is necessary for the left-region interpolated pixel creation unit 6L to create interpolated pixels in the left region, to the left-region interpolated pixel creation unit 6L, and supplies a video signal S1R, which is necessary for the right-region interpolated pixel creation unit 6R to create interpolated pixels in the right region, to the right-region interpolated pixel creation unit 6R. The frame memory 3 supplies a video signal S2L, which is necessary for the left-region interpolated pixel creation unit 6L to create interpolated pixels in the left region, to the left-region interpolated pixel creation unit 6L, and supplies a video signal S2R, which is necessary for the right-region interpolated pixel creation unit 6R to create interpolated pixels in the right region, to the right-region interpolated pixel creation unit 6R.

The video signal S1L is pixel data in the left region among the pixel data sequentially outputted as the video signal S1 from the frame memory 2, and is pixel data in which an address is shifted in the vertical direction in response to an offset amount indicated by the offset signal Sos1L. The video signal S2L is pixel data in the left region among the pixel data sequentially outputted from the frame memory 3, and is pixel data in which an address is shifted in the vertical direction in response to an offset amount indicated by the offset signal Sos2L. If the offset amount is 0, then the video signals S1L and S2L are pixel data which are not to be shifted.

The video signal S1R is pixel data in the right region among the pixel data sequentially outputted as the video signal S1 from the frame memory 2, and is pixel data in which an address is shifted in the vertical direction in response to an offset amount indicated by the offset signal Sos1R. The video signal S2R is pixel data in the right region among the pixel data sequentially outputted from the frame memory 3, and is pixel data in which an address is shifted in the vertical direction in response to an offset amount indicated by the offset signal Sos2R. If the offset amount is 0, then the video signals S1R and S2R are pixel data which are not to be shifted.

In response to the offset amounts of the offset signals Sos1L and Sos2L, the selection control unit 61 in the left-region interpolated pixel creation unit 6L shifts positions of the pixel data in the vertical direction, which are taken as references in the delay section units 62 and 63. In response to the offset amounts of the offset signals Sos1R and Sos2R, the selection control unit 61 in the right-region interpolated pixel creation unit 6R shifts positions of the pixel data in the vertical direction, which are taken as references in the delay section units 62 and 63. By operations similar to those of the interpolated pixel creation unit 6 of FIG. 1, the left-region interpolated pixel creation unit 6L creates a left-region interpolation signal, and the right-region interpolated pixel creation unit 6R creates a right-region interpolation signal. A signal obtained by combining the left-region interpolation signal and the right-region interpolation signal with each other is an interpolated frame signal.

To a time-series conversion memory 7, the video signal S1 inputted as an actual frame signal, and the left-region interpolation signal and the right-region interpolation signal are inputted as the interpolation frame signal. The time-series conversion memory 7 synthesizes the left-region interpolation signal and the right-region interpolation signal with each other, thereby forming interpolated pixel data of the interpolated frame signal. The time-series conversion memory 7 alternately reads out the pixel data of the actual frame signals and the interpolated pixel data of such interpolated frame signals at the vertical frequency of 120 Hz, thereby outputting a video signal subjected to the frame rate conversion.

Figure 18:
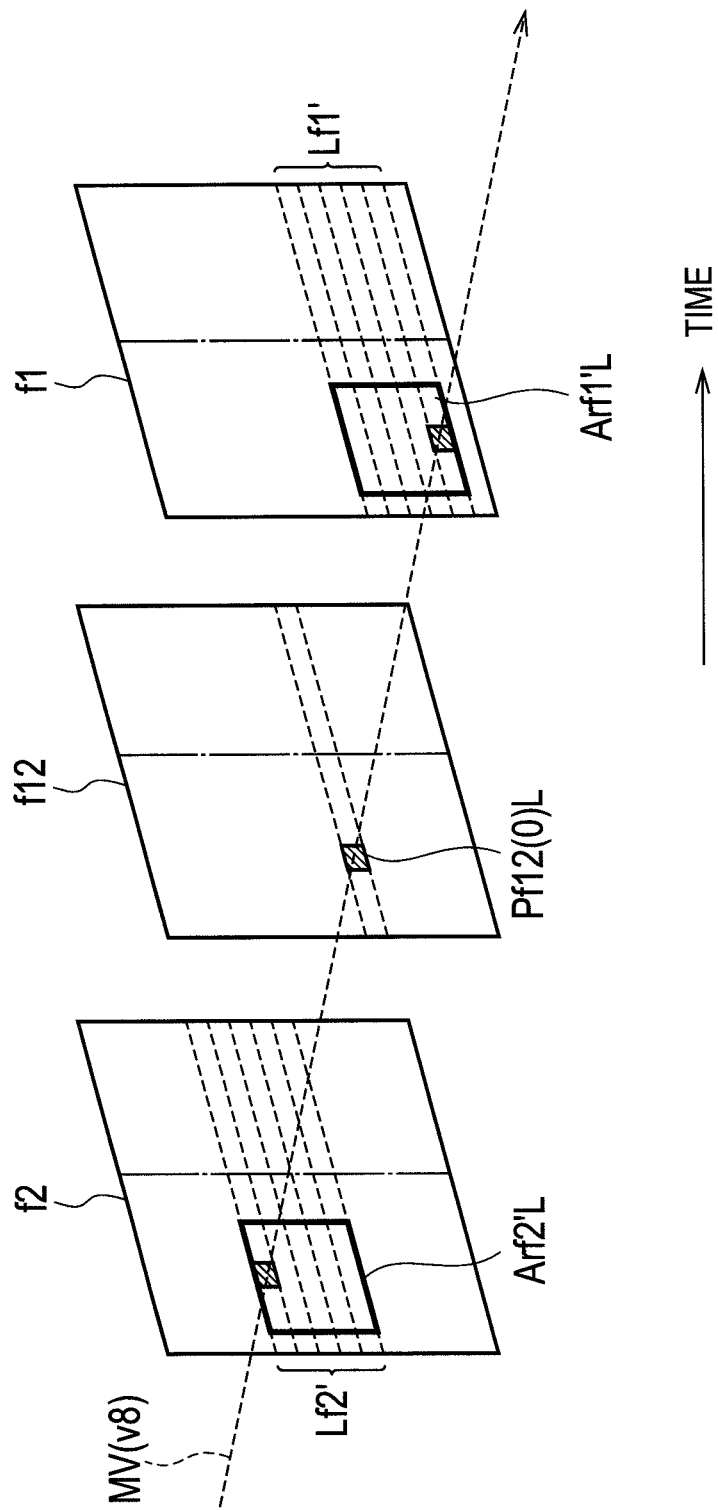
FIG. 18 is a conceptual view for explaining an interpolated pixel creation operation in a case where the read address in the vertical direction in each of the frame memories 2 and 3 is shifted in a left region.
Figure 19:
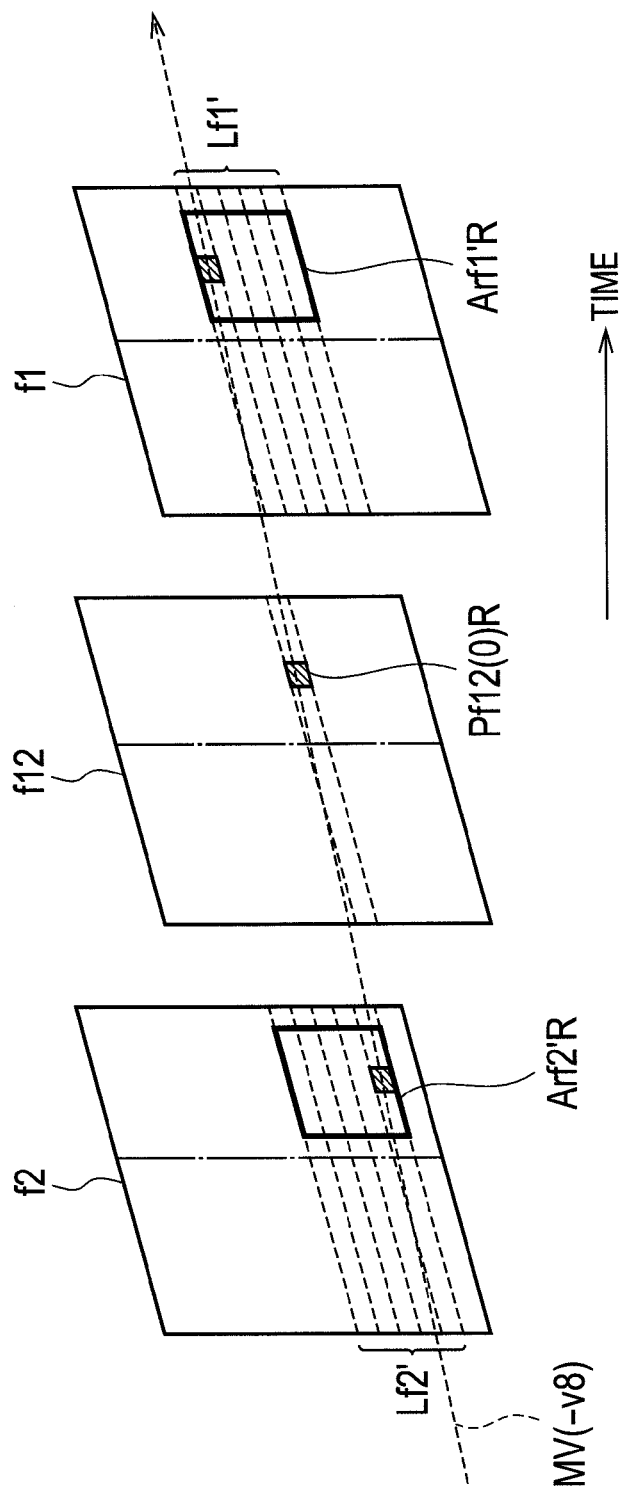
FIG. 19 is a conceptual view for explaining an interpolated pixel creation operation in a case where the read address in the vertical direction in each of the frame memories 2 and 3 is shifted in a right region.
Figure 20:
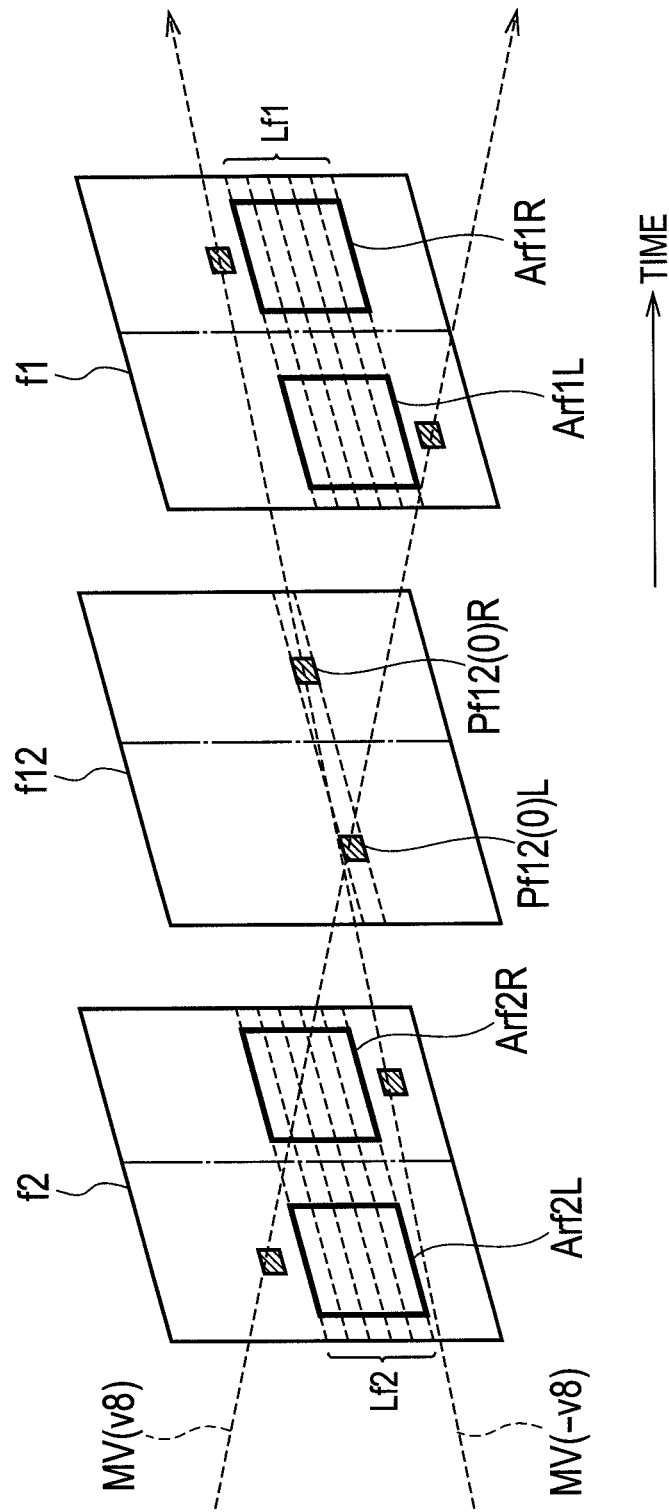
FIG. 20 is a conceptual view for explaining an interpolated pixel creation operation in a case where the read address in the vertical direction in each of the frame memories 2 and 3 is shifted in the left region and the right region.

By using FIG. 18 to FIG. 20, a description is made of effects brought by the fifth embodiment. FIG. 18 shows a region Arf1'L shifted downward in the vertical direction and a region Arf2'L shifted upward in the vertical direction in the left regions of the frames f1 and f2. Even if the motion vector MV is a motion vector MV(v8) in which the vertical component is 8 pixels, pixels in the frames f1 and f2, which serve for creating an interpolated pixel Pf12(0)L, are located within ranges of the regions Arf1'L and Arf2'L, and the left-region interpolated pixel creation unit 6L can create the interpolated pixel Pf12(0)L.

FIG. 19 shows a region Arf1' R shifted upward in the vertical direction and a region Arf2'R shifted downward in the vertical direction in the right regions of the frames f1 and f2. In FIG. 19, the vertical component of the motion vector MV is −8 pixels in the opposite direction to that in FIG. 18, and the motion vector MV is MV(−v8). Even if the motion vector MV is the motion vector MV(−8) in which the vertical component is −8 pixels, pixels in the frames f1 and f2, which serve for creating an interpolated pixel Pf12(0)R, are located within ranges of the regions Arf1' R and Arf2'R, and the right-region interpolated pixel creation unit 6R can create the interpolated pixel Pf12(0)R.

For comparison with FIG. 18 and FIG. 19, FIG. 20 shows a case where one frame is not divided into right and left halves, and the motion vectors MV are monitored in the whole of one frame to create the offset signals Sos1 and Sos2 in a similar way to the first embodiment. As shown in FIG. 17C, the frequency does not exceed the threshold value y in each of the specific classes CLsp, and accordingly, the offset amounts become 0, and regions Arf1L, Arf1R, Arf2L and Arf2R for creating the interpolated pixels Pf12(0) L and Pf12(0)R are not shifted. Hence, in the case where the motion vector is the motion vector MV(v8) in the left region, and the motion vector is the motion vector MV(−v8) in the right region, then the interpolated pixels Pf12(0)L and Pf12(0)R cannot be created.

As described above, in accordance with the fifth embodiment, even in the case where the motions different from each other are made in the plurality of regions in the frames, it becomes possible to expand the range of the interpolation processing appropriately for each of the regions. Hence, for each of the plurality of regions, the appropriate interpolated pixel can be created based on the motion vector even in the case where the motion of the image in the vertical direction is large.

In the fifth embodiment, the region of the frame is divided into two; however, may be divided into three or more, and how to divide the region in the horizontal direction and the number of partitions in this case just need to be set as appropriate. The frequency distribution monitor unit 4, the offset control unit 5 and the interpolated pixel creation unit 6 just need to be individually provided in response to the number of partitions.

The present invention is not limited to the first to fifth embodiments described above, and is modifiable in various ways within the scope without departing from the spirit of the present invention. In each of the first to fifth embodiments, the configuration including the motion vector detection unit 1 is shown; however, a configuration may be adopted so that motion vectors MV detected for use in other devices can be supplied to the frequency distribution monitor unit 4 (4L, 4R) and the interpolated pixel creation unit 6 (6L, 6R). The frequency distribution monitor unit 4 (4L, 4R) defines, as the frequency, the number of occurrences of each class in one frame; however, may define the number of occurrences thereof in two frames as the frequency, and the number of occurrences just needs to be set as appropriate.

What is claimed is:

1. A video signal processing apparatus comprising:
   a first delay unit configured to delay an input video signal by one frame period or a period of a plurality of lines, and to output the input video signal thus delayed as a first delayed video signal;
   a second delay unit configured to delay the first delayed video signal by one frame period, and to output the first delayed video signal thus delayed as a second delayed video signal;
   a first delay selection unit configured to sequentially delay pixel data of the first delayed video signal in horizontal and vertical directions, to create a plurality of pixel data included in a first reference range for use in an event of creating interpolated pixel data, and to select any from the plurality of pixel data;
   a second delay selection unit configured to sequentially delay pixel data of the second delayed video signal in the horizontal and vertical directions, to create a plurality of pixel data included in a second reference range for use in the event of creating the interpolated pixel data, and to select any from the plurality of pixel data;
   a frequency distribution monitor unit configured to partition, into a plurality of classes, a size of a vertical component of a motion vector for use in the event of creating the interpolated pixel data, and to detect a frequency of the number of occurrences at which the vertical component of the motion vector occurs in each of the classes;
   an offset control unit configured, in a case where the vertical component of the motion vector, the vertical component being detected in the frequency distribution monitor unit, exceeds a predetermined threshold value in predetermined specific classes, to create a first offset signal that shifts a read address in the vertical direction in an event of reading out the first delayed video signal from the first delay unit and then to supply the created first offset signal to the first delay unit, and to create a second offset signal that shifts a read address in the vertical direction in an event of reading out the second delayed video signal from the second delay unit and then to supply the created second offset signal to the second delay unit; and
   a selection control unit configured to shift the pixel data in the vertical direction based on the first offset signal, the pixel data being selected by the first delay selection unit, and to shift the pixel data in the vertical direction based on the second offset signal, the pixel data being selected by the second delay selection unit.

2. The video signal processing apparatus according to claim 1,
   wherein the offset control unit creates, as the first offset signal, an offset signal that shifts, in a first direction, the read address in the vertical direction in the first delay unit, and creates, as the second offset signal, an offset signal that shifts the read address in the vertical direction in the second delay unit in a second direction opposite to the first direction, and
   the selection control unit controls the first and second delay selection units to shift, in a first vertical direction, the pixel data selected by the first delay selection unit, and to shift the pixel data in a second vertical direction opposite to the first vertical direction based on the second offset signal, the pixel data being selected by the second delay selection unit.

3. The video signal processing apparatus according to claim 1,
   wherein the offset control unit sets the specific classes at classes where the pixel data corresponding to the size of the vertical component of the motion vector departs from the first and second reference ranges in a state where the read addresses in the first and second delay units are not shifted by the first and second offset signals, and where the pixel data selected by the first and second delay selection units are not shifted by the selection control unit.

4. The video signal processing apparatus according to claim 3, further comprising:
   a determination unit configured to determine whether or not a state occurs where the frequency of the vertical component of the motion vector, the vertical component being detected in the frequency distribution monitor unit, exceeds the predetermined threshold value in any class of the specific classes, and where the frequency exceeds the predetermined threshold value in a class in which a motion direction in the vertical direction is opposite to a motion direction of the any class where the frequency exceeds the predetermined threshold value, the class being other than the specific classes,
   wherein, in a case where the determination unit determines the state, the offset control unit restricts an extent of the shift of the read addresses in the first and second delay units by the first and second offset signals to a value smaller than in a case where the determination unit does not determine the state, and the selection control unit controls the pixel data selected by the first and second delay selection units to be shifted in the vertical direction based on the first and second offset signals in which the extent of the shift is restricted.

5. The video signal processing apparatus according to claim 4, wherein the offset control unit creates the first and second offset signals based on a value of a vertical component obtained by adding, to each other, a vertical component in either one of positive and negative directions in a class in which the frequency of the vertical component, the frequency exceeding the predetermined threshold value, is highest, and a vertical component in other of the positive and negative directions in a class in which the frequency exceeds the predetermined threshold value, the class being other than the specific classes.

6. The video signal processing apparatus according to claim 1, further comprising:

a film signal detection unit configured to detect whether or not the input video signal is a video signal in which a frequency of a film image is converted into a predetermined vertical frequency by pull down, wherein, in a case where the film signal detection unit detects that the input video signal is the video signal in which the frequency is converted by the pull down, the offset control unit sets the extent of the shift of the read addresses in the first and second delay units by the first and second offset signals at a value larger than in a case where the film signal detection unit does not detect that the input video signal is the video signal in which the frequency is converted by the pull down.

7. The video signal processing apparatus according to claim 6, wherein the film signal detection unit detects whether the input video signal is a video signal obtained by converting the film image by 2-2 pull down or a video signal obtained by converting the film image by 2-3 pull down, and in a case where the film signal detection unit detects that the input video signal is the video signal obtained by converting the film image by the 2-3 pull down, the offset control unit sets the extent of the shift of the read addresses in the first and second delay units by the first and second offset signals at a value larger than in a case where the film signal detection unit detects that the input video signal is the video signal obtained by converting the film image by the 2-2 pull down.

8. The video signal processing apparatus according to claim 1, wherein an operation of the selection by the first delay selection unit, an operation of the selection by the second delay selection unit, an operation of the detection by the frequency distribution monitor unit, an operation of the supply of the first and second offset signals by the offset control unit, and an operation of the shift by the selection control unit are performed for each of a plurality of regions obtained by dividing a frame of the input video signal.

9. A video signal processing method comprising:

by a first delay unit, delaying an input video signal by one frame period or a period of a plurality of lines, and outputting the input video signal thus delayed as a first delayed video signal;

by a second delay unit, delaying the first delayed video signal by one frame period, and outputting the first delayed video signal thus delayed as a second delayed video signal;

sequentially delaying pixel data of the first delayed video signal in horizontal and vertical directions, and creating a plurality of pixel data included in a first reference range for use in an event of creating interpolated pixel data;

sequentially delaying pixel data of the second delayed video signal in the horizontal and vertical directions, and creating a plurality of pixel data included in a second reference range for use in the event of creating the interpolated pixel data;

partitioning, into a plurality of classes, a size of a vertical component of a motion vector for use in the event of creating the interpolated pixel data, and detecting a frequency of the number of occurrences at which the vertical component of the motion vector occurs in each of the classes;

in a case where the vertical component of the motion vector exceeds a predetermined threshold value in predetermined specific classes, shifting, based on a first offset signal, a read address in the vertical direction in an event of reading out the first delayed video signal from the first delay unit, and shifting, based on a second offset signal, a read address in the vertical direction in an event of reading out the second delayed video signal from the second delay unit;

shifting, based on the first offset signal, a position of first pixel data in the vertical direction in an event of selecting and reading out the first pixel data from plurality of pixel data within the first reference range, and shifting, based on the second offset signal, a position of second pixel data in the vertical direction in an event of selecting and reading out the second pixel data from plurality of pixel data within the second reference range; and creating the interpolated pixel data based on the first pixel data read out from the first reference range, and on the second pixel data read out from the second reference range.

10. The video signal processing method according to claim 9, wherein, based on the first offset signal, the read address in the vertical direction in the first delay unit is shifted in a first direction, and based on the second offset signal, the read address in the vertical direction in the second delay unit is shifted in a second direction opposite to the first direction, and based on the first offset signal, a position of reading out the pixel data from the plurality of pixel data within the first reference range is shifted in a first vertical direction, and the first pixel data is read out, and based on the second offset signal, a position of reading out the pixel data from the plurality of pixel data within the second reference range is shifted in a second vertical direction opposite to the first vertical direction.

11. The video signal processing method according to claim 9, wherein the specific classes are set at classes where the pixel data corresponding to the size of the vertical component of the motion vector departs from the first and second reference ranges in a state where the read addresses in the first and second delay units are not shifted, and where the positions of reading out the pixel data from the pluralities of pixel data depart from the first and second reference ranges.

12. The video signal processing method according to claim 11,
wherein it is determined whether or not a state occurs where the frequency of the vertical component of the motion vector exceeds the predetermined threshold value in any class of the specific classes, and where the frequency exceeds the predetermined threshold value in a class in which a motion direction in the vertical direction is opposite to a motion direction of the any class where the frequency exceeds the predetermined threshold value, the class being other than the specific classes, in a case where the state is determined, an extent of the shift of the read addresses in the first and second delay units by the first and second offset signals is restricted to a value smaller than in a case where the state is not determined, and based on the first and second offset signals in which the extent of the shift is restricted, the positions of the first and second pixel data in the vertical direction in the event of selecting and reading out the first and second pixel data from the pluralities of pixel data within the first and second reference ranges are sifted.

13. The video signal processing method according to claim 12,
wherein the first and second offset signals are created based on a value of a vertical component obtained by adding, to each other, a vertical component in either one of positive and negative directions in a class in which the frequency of the vertical component, the frequency exceeding the predetermined threshold value, is highest, and a vertical component in other of the positive and negative directions in a class in which the frequency exceeds the predetermined threshold value, the class being other than the specific classes.

14. The video signal processing method according to claim 9,
wherein it is detected whether or not the input video signal is a video signal in which a frequency of a film image is converted into a predetermined vertical frequency by pull down, and in a case where it is detected that the input video signal is the video signal in which the frequency is converted by the pull down, the extent of the shift of the read addresses in the first and second delay units by the first and second offset signals is set at a value larger than in a case where it is not detected that the input video signal is the video signal in which the frequency is converted by the pull down.

15. The video signal processing method according to claim 14,
wherein it is detected whether the input video signal is a video signal obtained by converting the film image by 2-2 pull down or a video signal obtained by converting the film image by 2-3 pull down, and in a case where it is detected that the input video signal is the video signal obtained by converting the film image by the 2-3 pull down, the extent of the shift of the read addresses in the first and second delay units by the first and second offset signals at a value larger than in a case where it is detected that the input video signal is the video signal obtained by converting the film image by the 2-2 pull down.

16. The video signal processing method according to claim 9,
wherein the plurality of pixel data included in the first reference range are created in each of a plurality of regions obtained by dividing a frame of the input video signal, the plurality of pixel data included in the second reference range are created in each of the plurality of regions, the frequency of the number of occurrences is detected in each of the plurality of regions, the read addresses in the vertical direction are shifted in each of the plurality of regions, the positions of the first and second pixel data in the vertical direction in the event of selecting and reading out the first and second pixel data are shifted in each of the plurality of regions, and the interpolated pixel data is created in each of the plurality of regions.

* * * * *